United States Patent
Salem et al.

(10) Patent No.: US 10,873,423 B2
(45) Date of Patent: Dec. 22, 2020

(54) SYSTEMS AND METHODS FOR ALLOCATION OF UPLINK CONTROL CHANNEL RESOURCES IN UNLICENSED SPECTRUM

(71) Applicant: Huawei Technologies Co., Ltd., Shenzhen (CN)

(72) Inventors: Mohamed Adel Salem, Kanata (CA); Jiayin Zhang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/203,030

(22) Filed: Nov. 28, 2018

(65) Prior Publication Data
US 2019/0253200 A1    Aug. 15, 2019

Related U.S. Application Data

(60) Provisional application No. 62/631,273, filed on Feb. 15, 2018.

(51) Int. Cl.
| | |
|---|---|
| *H04L 1/18* | (2006.01) |
| *H04W 74/08* | (2009.01) |
| *H04W 72/04* | (2009.01) |
| *H04W 16/14* | (2009.01) |
| *H04L 5/00* | (2006.01) |

(52) U.S. Cl.
CPC ........... *H04L 1/1819* (2013.01); *H04W 16/14* (2013.01); *H04W 72/042* (2013.01); *H04W 72/0453* (2013.01); *H04W 74/0808* (2013.01); *H04W 74/0816* (2013.01); *H04L 5/001* (2013.01)

(58) Field of Classification Search
CPC . H04W 16/14; H04W 72/042; H04W 72/043; H04W 74/0808; H04W 74/0816; H04L 1/1819; H04L 5/001; H04L 5/0053; H04L 5/0055
See application file for complete search history.

(56) References Cited

U.S. PATENT DOCUMENTS

| | | | |
|---|---|---|---|
| 2015/0063140 A1* | 3/2015 | Yi | H04L 5/005 370/252 |
| 2017/0034817 A1* | 2/2017 | Park | H04L 5/0035 |

(Continued)

FOREIGN PATENT DOCUMENTS

| | | |
|---|---|---|
| CN | 106658742 A † | 5/2017 |
| CN | 107396386 A † | 11/2017 |
| WO | 2017207614 A1 † | 12/2017 |

*Primary Examiner* — Mewale A Ambaye
(74) *Attorney, Agent, or Firm* — Slater Matsil, LLP

(57) ABSTRACT

Wireless communication between a user equipment (UE) and a base station may occur on unlicensed spectrum. When wirelessly communicating on unlicensed spectrum, there is an expectation that there may be interference from others devices also transmitting on the same resources in the unlicensed spectrum. Systems and methods are therefore disclosed that aim to facilitate wireless communication in unlicensed spectrum. In some embodiments, systems and method are disclosed that are primarily directed to the uplink transmission of hybrid automatic repeat request (HARQ) feedback corresponding to a downlink data transmission, and the downlink data transmission and the HARQ feedback are both sent on unlicensed spectrum.

30 Claims, 17 Drawing Sheets

(56) References Cited

U.S. PATENT DOCUMENTS

| | | | |
|---|---|---|---|
| 2018/0160400 A1* | 6/2018 | Liu | H04W 52/325 |
| 2018/0338318 A1* | 11/2018 | Yum | H04L 5/00 |
| 2018/0367282 A1* | 12/2018 | Li | H04L 1/1896 |
| 2019/0036668 A1* | 1/2019 | Guan | H04L 5/0055 |
| 2019/0132103 A1* | 5/2019 | Yang | H04L 5/0037 |
| 2019/0149305 A1* | 5/2019 | Zhou | H04L 5/0023 370/330 |
| 2019/0246430 A1* | 8/2019 | Baghel | H04W 74/0816 |
| 2019/0274187 A1* | 9/2019 | Urabayashi | H04W 16/14 |
| 2019/0327765 A1* | 10/2019 | Mukherjee | H04W 74/0816 |
| 2020/0154475 A1* | 5/2020 | Pao | H04W 80/08 |

\* cited by examiner
† cited by third party

SYSTEMS AND METHODS FOR ALLOCATION OF UPLINK CONTROL CHANNEL RESOURCES IN UNLICENSED SPECTRUM

PRIORITY

The present application claims the benefit under 35 U.S.C § 119(e) of U.S. Provisional Patent Application Ser. No. 62/631,273, entitled "Systems and Methods for Allocation of Uplink Control Channel Resources in Unlicensed Spectrum", which was filed on Feb. 15, 2018, and which is incorporated herein by reference.

FIELD

The present application relates to wireless communication in unlicensed spectrum.

BACKGROUND

In some wireless communication systems, user equipments (UEs) wirelessly communicate with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a base station may wirelessly transmit data, such as a transport block (TB), to a UE in a downlink transmission at a particular frequency and over a particular duration of time. The frequency and time duration used are examples of resources.

Wireless communication between a UE and a base station may occur on licensed spectrum, on unlicensed spectrum, or on both. Licensed spectrum refers to frequency bands that are licensed for use by companies. A company licensing a particular frequency band has the right to wirelessly communicate using that frequency band in a given geographic area. Unlicensed spectrum refers to frequency bands that are not licensed for use by companies, and that are free to use by anybody in compliance with the regional spectrum regulations. When wirelessly communicating on unlicensed spectrum, there is an expectation that there may be interference from other devices also transmitting on the same resources in the unlicensed spectrum. Therefore, a device operating on unlicensed spectrum may use a listen before talk (LBT) protocol in which the device first listens to the wireless channel before sending a transmission.

It is desired to provide systems and methods that improve the reliability of wireless communication, and particularly uplink wireless communication, in unlicensed spectrum, e.g. such that mobile operators may at least partially offload their continuously increasing traffic load to the available unlicensed spectrum resources using a unified/integrated carrier-type air interface.

SUMMARY

Systems and methods are disclosed that aim to facilitate wireless communication in unlicensed spectrum. In some embodiments, systems and method are disclosed that are primarily directed to the uplink transmission of hybrid automatic repeat request (HARQ) feedback corresponding to a downlink data transmission, and the downlink data transmission and the HARQ feedback are both sent on unlicensed spectrum.

In one embodiment, there is provided a method performed by a UE. The method includes receiving a downlink transmission indicating a plurality of time-frequency resources on which an uplink transmission may be sent. The plurality of time-frequency resources are in a plurality of uplink frequency partitions of an unlicensed spectrum. The method may further include the following for each uplink frequency partition of the plurality of uplink frequency partitions: listening to a wireless channel in a frequency region of the uplink frequency partition to determine whether the wireless channel is unoccupied in the frequency region of the uplink frequency partition. The method may further include transmitting the uplink transmission in at least one of the uplink frequency partitions for which the frequency region of the wireless channel is unoccupied. A UE configured to perform the method is also provided.

In another embodiment, there is provided a method performed by a base station. The method includes transmitting a downlink transmission indicating a plurality of time-frequency resources on which an uplink transmission may be sent. The plurality of time-frequency resources are in a plurality of uplink frequency partitions of an unlicensed spectrum. The method may further include performing blind decoding on the plurality of time-frequency resources to obtain the uplink transmission in at least one of the plurality of uplink frequency partitions. A base station configured to perform the method is also provided.

The systems and methods of some embodiments may provide more reliable uplink transmission in unlicensed spectrum by using multiple frequency domain resource configurations.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example Communication Systems and Devices

Figure 1:
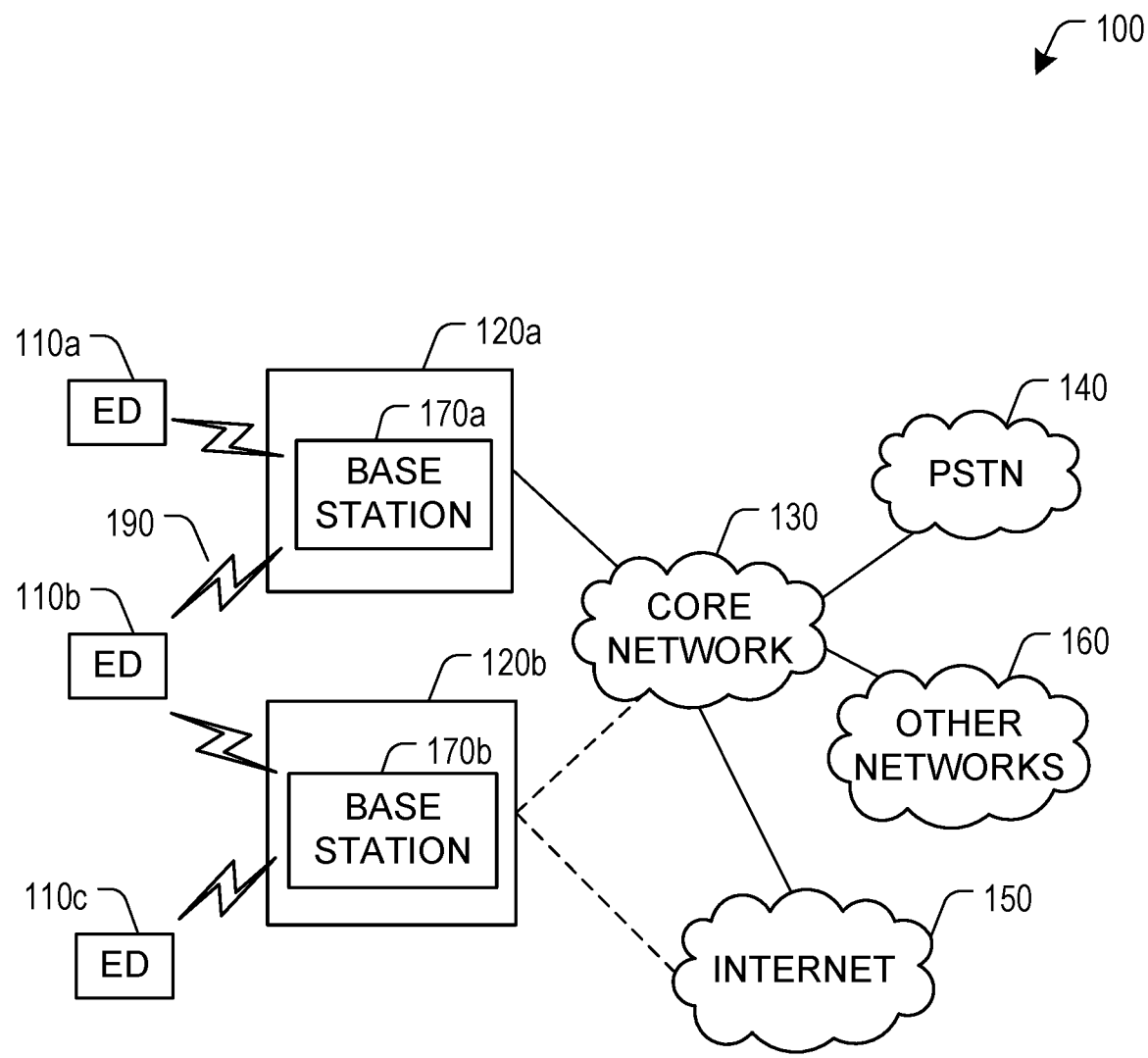
FIG. 1 is a network diagram of an example communication system.

FIG. 1 illustrates an example communication system 100. In general, the communication system 100 enables multiple wireless or wired elements to communicate data and other content. The purpose of the communication system 100 may be to provide content, such as voice, data, video, and/or text, via broadcast, narrowcast, user device to user device, etc. The communication system 100 may operate by sharing resources, such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB or eNB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 2:
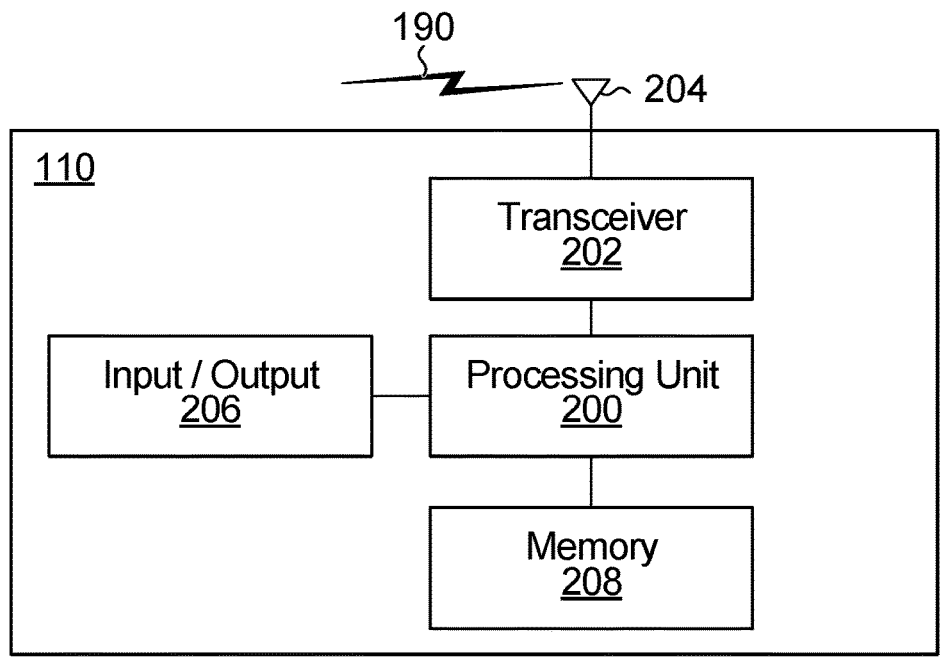
FIG. 2 is a block diagram of an example electronic device.
Figure 3:
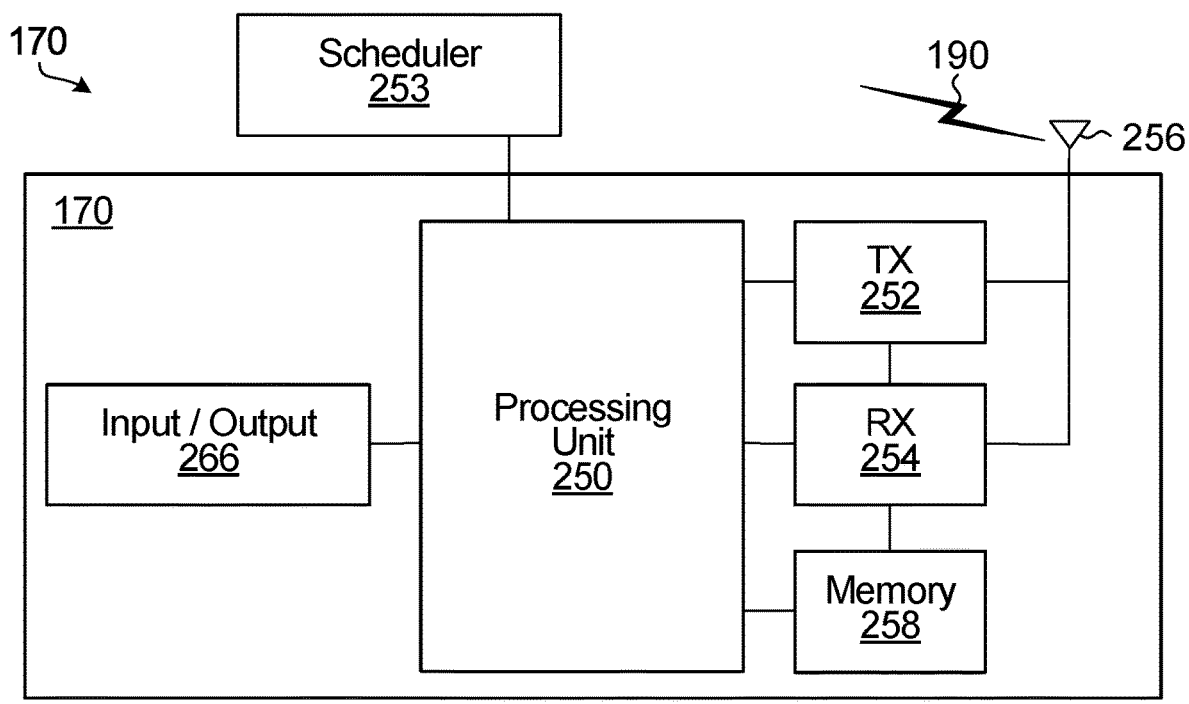
FIG. 3 is a block diagram of another example electronic device.

FIGS. 2 and 3 illustrate example devices that may implement the methods and teachings according to this disclosure. In particular, FIG. 2 illustrates an example ED 110, and FIG. 3 illustrates an example base station 170. These components could be used in the communication system 100 or in any other suitable system.

As shown in FIG. 2, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
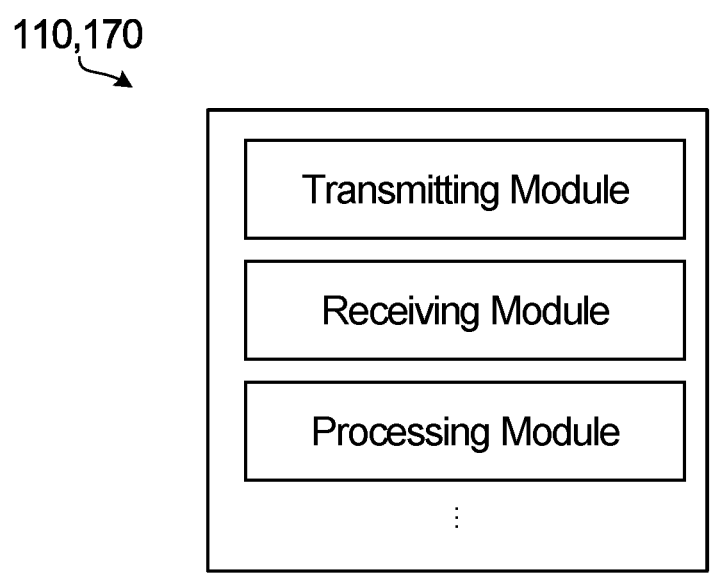
FIG. 4 is a block diagram of example component modules.

One or more steps of the embodiment methods provided herein may be performed by corresponding units or modules, according to FIG. 4. FIG. 4 illustrates units or modules in a device, such as in ED 110 or base station 170. For example, a signal may be transmitted by a transmitting unit or a transmitting module. A signal may be received by a receiving unit or a receiving module. A signal may be processed by a processing unit or a processing module. The processing module may encompass the units/modules described later, such as the uplink message generator, downlink message processor, encoder, decoder, timer, LBT unit, resource allocator, downlink message generator, and/or uplink message processor described below. Other units/modules may be included in FIG. 4, but are not shown. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Figure 5:
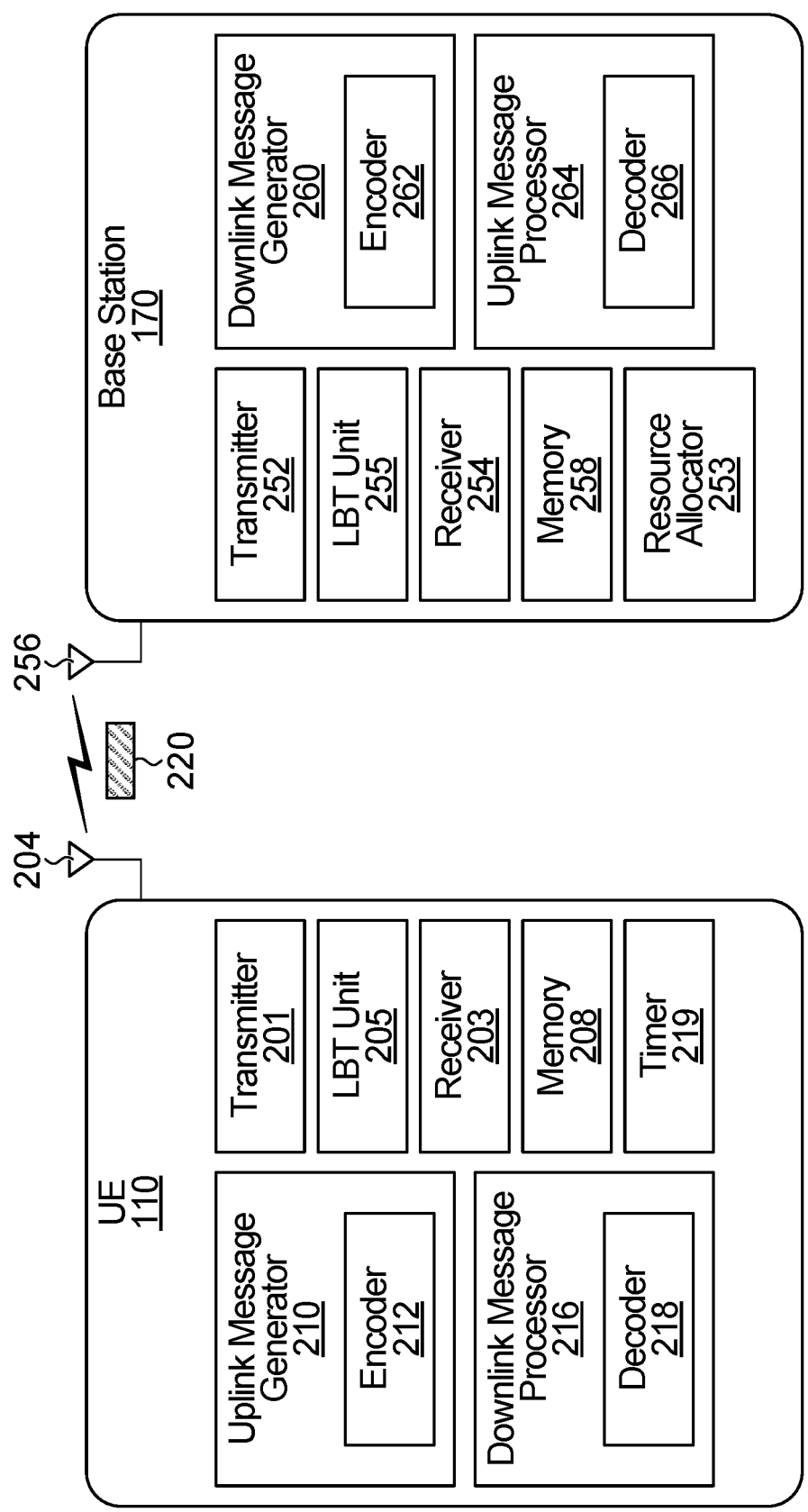
FIG. 5 is a block diagram of an example user equipment and base station.

FIG. 5 illustrates another example of an ED 110 and a base station 170. The ED 110 will hereafter be referred to as a user equipment (UE) 110. A transport block (TB) 220 is illustrated as being wirelessly transmitted between the base station 170 and the UE 110.

The base station 170 may be called other names in some implementations, such as a transmit and receive point (TRP), a base transceiver station, a radio base station, a network node, a transmit/receive node, a Node B, an evolved NodeB (eNodeB or eNB), a gNB, a relay station, or a remote radio head. In some embodiments, the parts of the base station 170 may be distributed. For example, some of the modules of the base station 170 may be located remote from the equipment housing the antennas of the base station 170, and may be coupled to the equipment housing the antennas over a communication link (not shown). Therefore, in some embodiments, the term base station 170 may also refer to modules on the network side that perform processing operations, such as resource allocation, message generation, and encoding/decoding, and that are not necessarily part of the equipment housing the antennas of the base station 170. The modules may also be coupled to other base stations. In some embodiments, the base station 170 may actually be a plurality of base stations that are operating together to serve the UE 110, e.g. through coordinated multipoint transmissions.

The base station 170 includes a transmitter 252 and a receiver 254 coupled to one or more antennas 256. Only one antenna 256 is illustrated. The transmitter 252 and the receiver 254 may be integrated as a transceiver. The base station 170 further includes an LBT unit 255 that may be used to implement the LBT protocols discussed herein when communicating on unlicensed spectrum. The LBT unit 255 may be part of the transmitter 252 and/or receiver 254. The base station 170 further includes a downlink message generator 260 for generating a downlink transmission to be sent to the UE 110, e.g. for generating the transmissions that convey the downlink control information (DCI) and downlink data transmissions described later. The downlink message generator 268 includes an encoder 262 for encoding the data to be sent in the downlink transmission. The downlink message generator 260 may be part of the transmitter 252. The base station 170 further includes an uplink message processor 264 for processing uplink transmissions received from the UE 110, e.g. for processing the uplink hybrid automatic repeat request (HARD) feedback described later. The uplink message processor 264 includes a decoder 266 for decoding the uplink transmission, e.g. for performing the blind decoding described later. The uplink message processor 264 may be part of the receiver 254. The base station 170 further includes a resource allocator 253, which may schedule the uplink resources to be allocated to UE 110 for uplink transmissions, and which may also schedule downlink transmissions. For example, the resource allocator 253 allocates the plurality of uplink time-frequency resource partitions described later, e.g. the uplink control channels that may be used to send the uplink HARQ feedback. The base station 100 further includes a memory 258 for storing information and data.

The downlink message generator 260, the encoder 262, the uplink message processor 264, the decoder 266, the resource allocator 253, the LBT unit 255, and/or any signal processing components of the transmitter 252 and receiver 254, may be implemented in the form of circuitry configured to perform the functions of the downlink message generator 260, the encoder 262, the uplink message processor 264, the decoder 266, the resource allocator 253, the LBT unit 255, and/or the transmitter 252 and receiver 254. In some implementations the circuitry includes memory 258 and one or more processors, such as processing unit 250 described earlier, that execute instructions that cause the one or more processors to perform the operations of the downlink message generator 260, the encoder 262, the uplink message processor 264, the decoder 266, the resource allocator 253, the LBT unit 255, and/or the transmitter 252 and receiver 254. Alternatively, the downlink message generator 260, the encoder 262, the uplink message processor 264, the decoder 266, the resource allocator 253, the LBT unit 255, and/or the transmitter 252 and receiver 254, may be implemented by a processing unit using dedicated integrated circuitry, such as an ASIC, a GPU, or an FPGA for performing the operations of the downlink message generator 260, the encoder 262, the uplink message processor 264, the decoder 266, the resource allocator 253, the LBT unit 255, and/or the transmitter 252 and receiver 254.

The UE 110 also includes a transmitter 201 and a receiver 203 coupled to one or more antennas 204. Only one antenna 204 is illustrated. The transmitter 201 and the receiver 203 may be integrated as a transceiver, e.g. transceiver 202. The UE 110 further includes an LBT unit 205 that is used to implement the LBT protocols discussed herein when communicating on unlicensed spectrum. The LBT unit 205 may be part of the transmitter 201 and/or receiver 203. The UE 110 further includes a downlink message processor 216, including a decoder 218. The downlink message processor 216 and decoder 218 perform operations relating to processing a received downlink message, such as the UE HARQ operations described herein, e.g. generating acknowledgements (ACKs) and/or negative acknowledgements (NACKs). The downlink message processor 216 may be part of the receiver 203. The UE 110 further includes an uplink message generator 210, including an encoder 212. The uplink message generator 210 and encoder 212 perform operations relating to generating an uplink transmission, e.g. an uplink message to be sent on an unoccupied one of the plurality of uplink time-frequency resource partitions described later, such as HARQ feedback to send on an uplink control channel. For example, the encoder 212 may perform operations relating to preparing an ACK or NACK for transmission to the base station 170. The uplink message generator 210 may be part of the transmitter 201. The UE 110 further includes a memory 208 for storing information and data. The UE 110 further includes a timer 119 that may implement the inactivity timer discussed later.

The downlink message processor 216, the decoder 218, the uplink message generator 210, the encoder 212, the timer 219, the LBT unit 205, and/or any signal processing components of the transmitter 201 and receiver 203, may be implemented in the form of circuitry configured to perform the functions of the downlink message processor 216, the decoder 218, the uplink message generator 210, the encoder 212, the timer 219, the LBT unit 205, and/or the transmitter 201 and receiver 203. In some implementations the circuitry includes memory 208 and one or more processors, such as processing unit 200 described earlier, that execute instructions that cause the one or more processors to perform the operations of the downlink message processor 216, the decoder 218, the uplink message generator 210, the encoder 212, the timer 219, the LBT unit 205, and/or the transmitter 201 and receiver 203. Alternatively, the downlink message processor 216, the decoder 218, the uplink message generator 210, the encoder 212, the timer 219, the LBT unit 205, and/or the transmitter 201 and receiver 203, may be implemented by a processing unit using dedicated integrated circuitry, such as an ASIC, a GPU, or an FPGA for performing the operations of the downlink message processor 216, the decoder 218, the uplink message generator 210, the encoder 212, the timer 219, the LBT unit 205, and/or the transmitter 201 and receiver 203.

The base station 170 and the UE 110 may include other components, but these have been omitted for the sake of clarity.

HARQ for Wireless Communications

Hybrid automatic repeat request (HARQ) is a method in which data to be transmitted is encoded using an error correction code. If the encoded data is corrupted during transmission and the receiver is unable to correct the errors, a retransmission is performed.

HARQ may be performed for uplink and/or downlink transmissions. For example, if TB 220 is sent from the base station 170 to the UE 110 in an initial downlink transmission, and the TB 220 is not successfully decoded by the UE 110, then a retransmission may be performed by the base station 170. The word "transmission" as used herein, may refer to an initial transmission or a retransmission. A retransmission may include a retransmission of the TB 220 and/or further information for decoding the TB 220. For example, the retransmission data may include some or all of the original data and/or parity information. For instance, the HARQ transmission may include one or more code block group (CBGs) of the TB. The decoder 218 of the UE 110 may perform HARQ combining as follows: instead of discarding unsuccessfully decoded initial data, the unsuccessfully decoded initial data may be stored at the UE 110 in memory 208 and combined with received retransmission data to try to successfully decode the TB 220. When HARQ combining is performed, the retransmission data from the base station 170 may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). Different RVs may also be referred to as different revisions. When data is encoded by encoder 262 in the base station 170, the encoded bits may be partitioned into different sets that possibly overlap with each other. Each set is a different RV. For example, some RVs may have more parity bits than other RVs. Each RV is identified by an RV index, e.g. RV 0, RV 1, RV 2, . . . etc. When a downlink transmission is sent using a particular RV, then only the encoded bits corresponding to that RV are transmitted. Different channel codes may be used to generate the encoded bits, e.g. turbo codes, low-density parity-check (LDPC) codes, polar codes, etc. In one embodiment, the channel coding results in an encoded bit stream having three bit streams: a systematic bit stream and two parity bit streams. Rate matching may be performed, and a circular buffer (not illustrated) may store the systematic and parity bits. The bits may be read from the circular buffer and modulated for transmission in the uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The UE 110 uses knowledge of the RV to perform decoding. For chase combining, the RV of the initial and retransmissions may be the same, e.g. RV 0. For incremental redundancy, the retransmissions may use a higher RV that may follow a predetermined pattern, e.g. RV 0 for the initial transmission, RV 2 for the first retransmission, RV 3 for the second retransmission, and RV 1 for the third retransmission. Therefore, in order to decode the data, it may be necessary for the UE 110 to know the RV index of the data being received, unless there is only one predefined RV.

As part of the HARQ procedure for a downlink transmission, an ACK may be sent by the UE 110 when the UE 110 successfully decodes the TB of the downlink transmission. In some embodiments, a NACK may be sent by the UE 110 when the TB is not successfully decoded. The ACK and NACK are examples of HARQ feedback. HARQ feedback is sometimes alternatively referred to as ACK/NACK feedback or A/N feedback. The HARQ ACK/NACK feedback may also be CBG-based.

A HARQ process may be synchronous, in which case retransmissions are scheduled at predetermined time intervals and based on a systematic timing derived from the system information, e.g. as in LTE grant-based uplink HARQ. If a HARQ process is not synchronous, then it is asynchronous.

Wireless Communication on Licensed and Unlicensed Spectrum

A wireless communication between a UE 110 and a base station 170 is transmitted on a carrier frequency, e.g. on a component carrier (CC). A CC may be referred to as a cell. A CC may be characterized by its bandwidth and the center frequency of the CC. For example, the bandwidth of a CC may be 20 MHz, or an integer multiple of 20 MHz. Some CCs may be on licensed spectrum, whereas other CCs may be on unlicensed spectrum. A CC on unlicensed spectrum may be referred to as an unlicensed CC.

The UE 110 may wirelessly communicate with the base station 170 on one or more bandwidth parts (BWPs) within the bandwidth of a CC. A BWP is a contiguous set of frequency subcarriers selected from the contiguous subcarriers of a given CC for a given numerology, e.g. for a given subcarrier spacing (SCS). A BWP of a CC may be referred to as a carrier BWP. The network may configure the UE 110 to transmit and/or receive data and/or control information on one or more uplink and/or downlink BWPs. The configuration of BWPs in a CC is UE-specific. From the network perspective, UEs configured to use the same CC may have different configurations of BWPs. For example, UE 110 may be configured to transmit and/or receive on two BWPs of a CC, whereas another UE may be configured to transmit and/or receive on three BWPs of the same CC, whereas another UE may be configured to only transmit and/or receive on one BWP of that same CC. The BWPs configured for a UE on the same CC may have the same or different bandwidths. The one or more BWPs configured for one UE may partially or fully overlap with the one or more BWPs configured for one or more of the other UEs on the CC. Also, if a UE is configured to transmit and/or receive on multiple BWPs on a CC, then that UE's multiple BWPs may be contiguous with each other, or the multiple BWPs may partially or fully overlap with each other.

Figure 6:
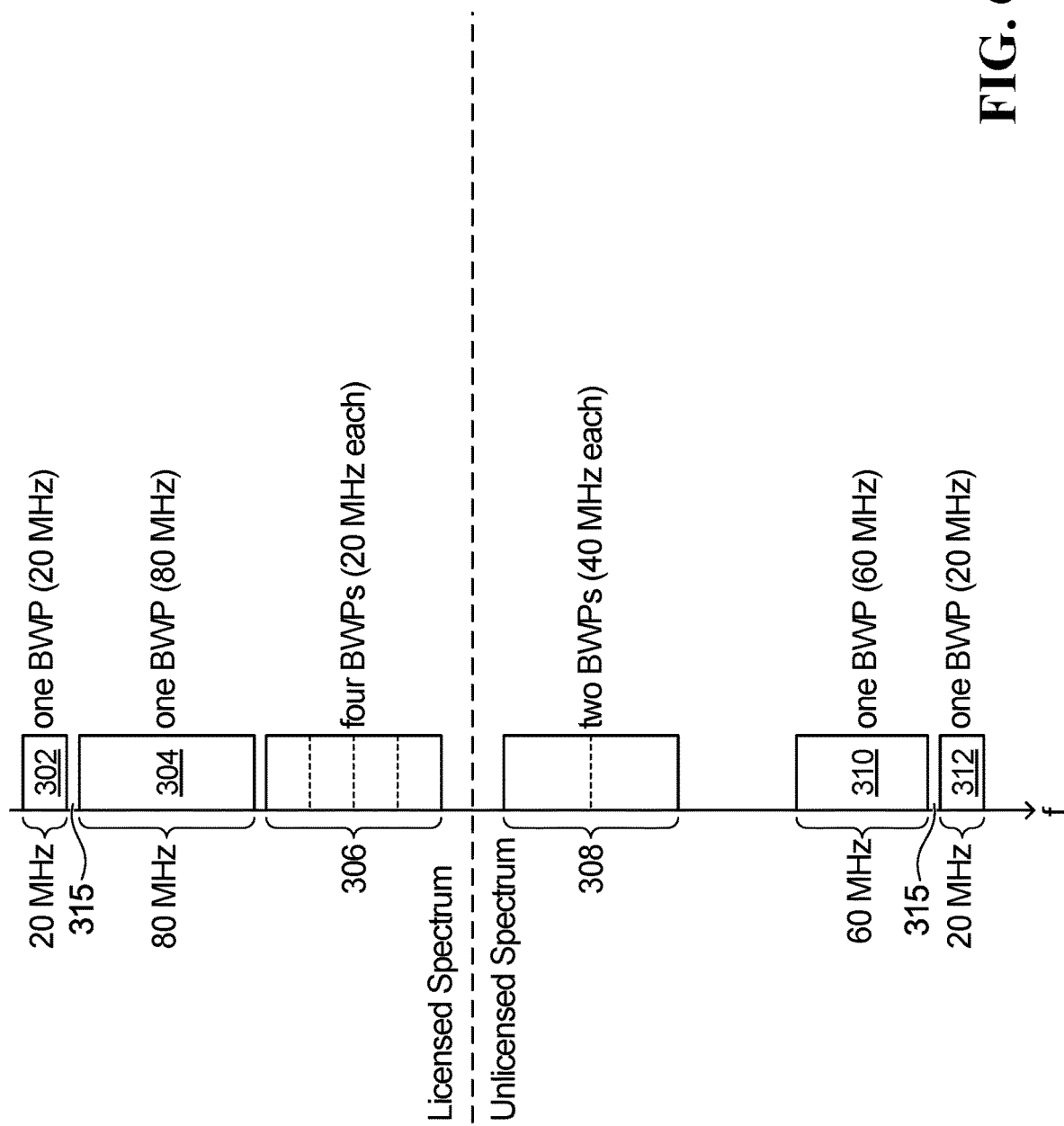
FIG. 6 illustrates an example of bandwidth parts on licensed and unlicensed spectrum.

FIG. 6 illustrates an example of six CCs on a frequency spectrum of a wireless channel. The six CCs are respectively labelled 302, 304, 306, 308, 310, and 312. CCs 302, 304, and 306 are in the licensed spectrum and are contiguous with each other. A guard band 315 is interposed between adjacent pairs of contiguous CCs. CCs 308, 310, and 312 are in the unlicensed spectrum. CCs 310 and 312 are contiguous with each other, and may be separated by a guard band 315. CC 308 is not contiguous with CC 310. In FIG. 6, CC 302 has a bandwidth of 20 MHz and consists of one BWP configured for a UE. CC 304 has a bandwidth of 80 MHz and consists of one BWP configured for a UE. CC 306 has a bandwidth of 80 MHz and consists of four adjacent contiguous BWPs configured for a UE, each BWP being 20 MHz. CC 308 has a bandwidth of 80 MHz and consists of two adjacent contiguous BWPs configured for a UE, each BWP being 40 MHz. CC 310 has a bandwidth of 60 MHz and consists of one BWP configured for a UE. CC 312 has a bandwidth of 20 MHz and consists of one BWP configured for a UE. The CCs shown in FIG. 6 are only examples. More generally, a CC may be on licensed or unlicensed spectrum, a CC may be contiguous with other CCs or not, a CC may have any bandwidth up to the maximum number of subcarriers the radio frequency (RF) chain can handle in parallel, and a CC may consist of one or more BWPs. If a CC consists of more than one BWP, then each BWP may have a same bandwidth, or one or more of the BWPs may have different bandwidths. Different BWPs may be used to transmit at different numerologies, e.g. at different subcarrier spacings (SCSs) and/or Cyclic Prefix (CP) lengths. Although not shown in FIG. 6, different BWPs may overlap each other in frequency.

A BWP of a CC may be used to send and/or receive wireless communications on the time-frequency resources of the BWP. In some embodiments, a BWP can be associated with an index to identify the BWP within a set of pre-configured BWPs. In a frequency division duplex (FDD) scheme, the UE may be configured with one or more downlink BWPs on a downlink CC and one or more uplink BWPs on an uplink CC. In such an implementation, an uplink BWP can be paired with a downlink BWP for FDD communications with the network. However, in a time division duplex (TDD) scheme, i.e., unpaired spectrum, a downlink BWP and an uplink BWP with the same index are implicitly paired for TDD communications with the network.

Figure 7:
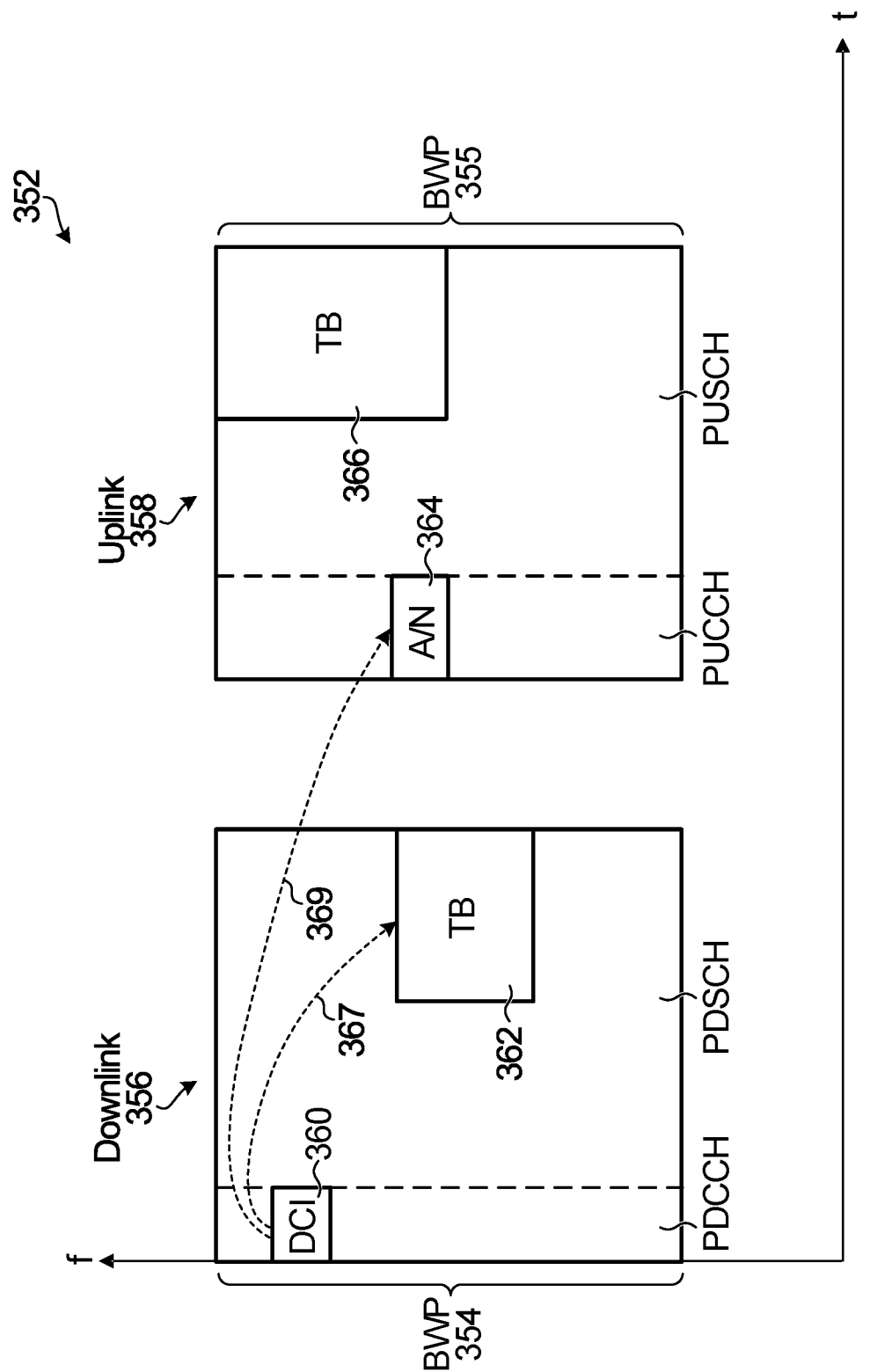
FIG. 7 illustrates time-frequency resources in a time division duplex scheme.

For example, FIG. 7 illustrates a set of time-frequency resources 352 in a TDD scheme in which a BWP 354 has downlink time-frequency resources 356, and in which a paired uplink BWP 355 has uplink time-frequency resources 358. BWPs 354 and 355 are illustrated as having the same bandwidth, but this need not be the case. For example, BWPs 354 and 355 may be aligned in terms of central frequency, but may have different bandwidths. The downlink time-frequency resources 356 are used to transmit downlink transmissions from the base station 170 to the UE 110, e.g. via OFDM symbols. Some of the downlink time-frequency resources may be used to send control information, such as downlink control information (DCI), and other downlink time-frequency resources may be used to send data. For example, FIG. 7 illustrates a physical downlink control channel (PDCCH) on which DCI 360 is transmitted to UE 110, and a physical downlink shared channel (PDSCH) on which a transport block (TB) 362 carrying data is transmitted to UE 110. One DCI may correspond to one PDCCH, or the PDCCH may carry multiple DCIs. The time-frequency resources used to carry the one or more DCIs may be referred to as a COntrol REsource SET ("CORESET").

The uplink time-frequency resources 358 are used to transmit uplink transmissions from the UE 110 to the base station 170, e.g. via OFDM symbols. Some of the uplink time-frequency resources may be used to send control information, such as HARQ feedback for the downlink transmissions, and other uplink time-frequency resources may be used to send data. As an example, FIG. 7 illustrates a physical uplink control channel (PUCCH) on which HARQ feedback 364 is transmitted to base station 170, and a physical uplink shared channel (PUSCH) on which a TB 366 is transmitted to base station 170.

The downlink time-frequency resources 356 and/or the uplink time-frequency resources 358 may be partitioned into time intervals. Each time interval may be called a subframe or slot or mini-slot or scheduling interval, depending upon the implementation.

The DCI 360 sent in the PDCCH may both: i) schedule the TB 362 on a partition of the time-frequency resources of the PDSCH, as shown via stippled line 367; and ii) grant the uplink resources, including the uplink time-frequency resource allocation for the PUCCH, that is used for sending the HARQ feedback 364 for the TB 362, as shown via stippled line 369. Although not shown in FIG. 7, the DCI 360 may schedule a transmission of multiple TBs in the downlink data channel, in which case the resources for the HARQ feedback for each of the multiple TBs may also be allocated by the DCI 360. FIG. 7 only shows the example of one scheduled downlink TB 362 and corresponding HARQ feedback 364.

The partition of the PDCCH and the PDSCH in the downlink, and the partition of the PUCCH and PUSCH in the uplink, are only examples and may be logical partitions.

Figure 8:
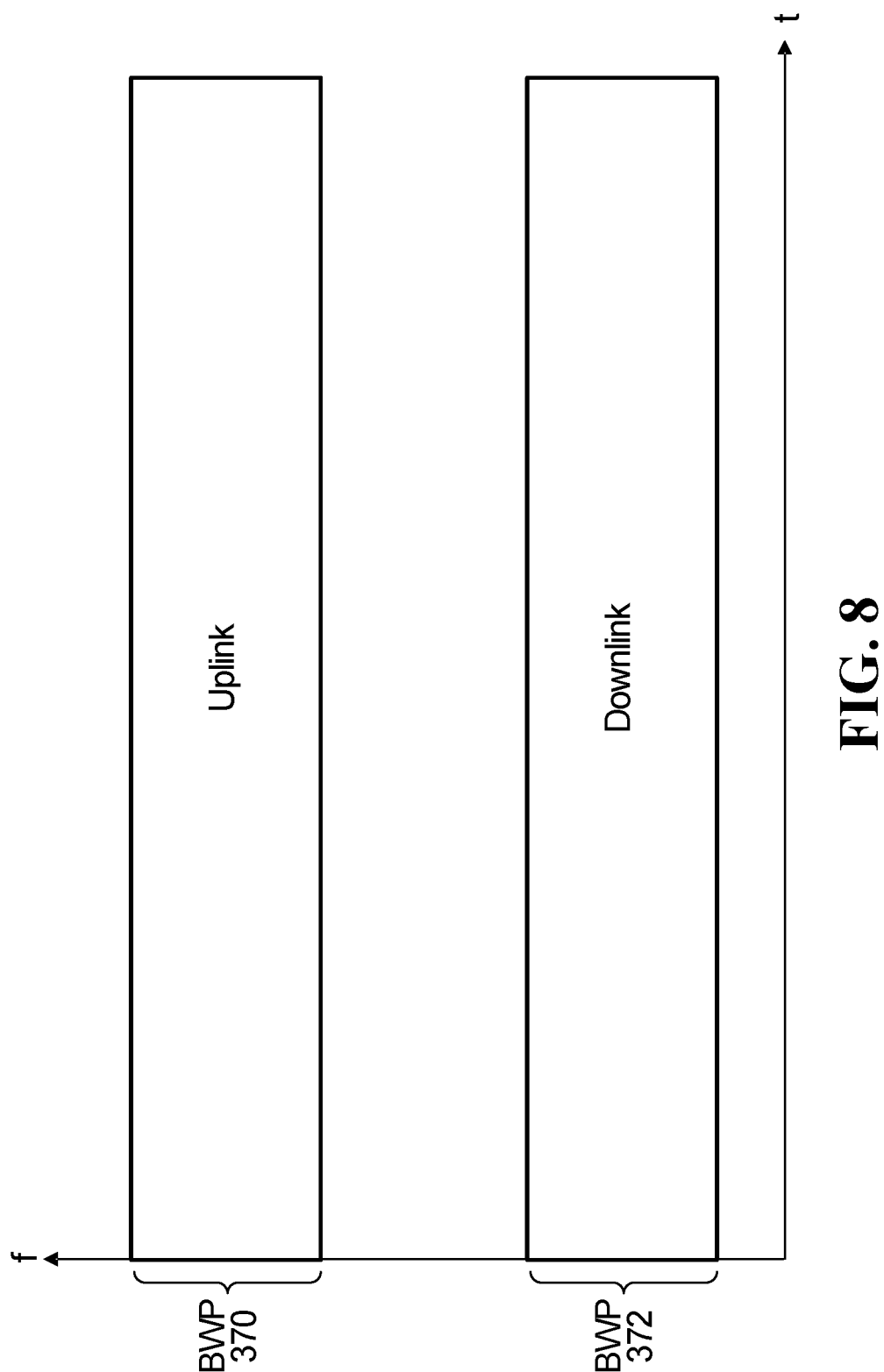
FIG. 8 illustrates two contiguous bandwidth parts in a frequency division duplex scheme.

In an FDD implementation, one BWP or portion thereof may be used for downlink, and another BWP or portion thereof may be used for uplink. FIG. 8 illustrates two contiguous BWPs 370 and 372. BWP 370 is used for uplink transmissions, and BWP 372 is used for downlink transmissions.

The TDD implementation of FIG. 7 is an example of unpaired spectrum, and the FDD implementation of FIG. 8 is an example of paired spectrum. Paired BWPs may be inherent for unpaired spectrum, e.g. paired BWPs may be inherent for TDD.

A BWP is considered "active" for UE 110 when the UE 110 is activated to transmit and/or receive on the BWP. If a BWP is active for UE 110, then the UE 110 is said to be active on the BWP. For example, returning to FIG. 6, UE 110 may be active to send and receive transmissions on one, some, or all of the four BWPs on CC 306. In some embodiments, UE 110 may be activated and deactivated to use certain BWPs via control information received from the base station 170.

When wirelessly communicating on unlicensed spectrum, there is an expectation that the time-frequency resources allocated for downlink and/or uplink transmissions may be occupied by other coexisting transmitters/systems, which may cause interference. Therefore, a device operating on unlicensed spectrum may use a listen before talk (LBT) protocol in which the device first listens to the wireless channel to determine the availability of the channel, before sending a transmission. The wireless channel may sometimes be referred to as the medium.

For example, before UE 110 sends an uplink transmission on particular frequency resources, e.g. on a particular active BWP or portion thereof, the UE 110 may listen to the wireless channel on those frequency resources. The UE 110 may listen for a configured or randomly generated duration of time before sending the uplink transmission. For example, the UE 110 may listen over multiple clear channel assessment (CCA) time slots to determine whether another transmission is already occurring on the frequency resources. If another transmission is already occurring, then the channel is said to be occupied, busy or acquired. If the UE 110 detects that the channel is already occupied, the UE 110 will not send the uplink transmission on the allocated resource. If the UE 110 determines that the channel is unoccupied, i.e. that the channel is idle (which may also be referred to as "free"), then the UE 110 acquires the channel and sends the uplink transmission. However, there still may be a collision due to the hidden node problem, e.g. if another UE or base station that is far enough from UE 110 to be sensed also transmits concurrently causing interference at the base station 170.

Similarly, before base station 170 sends a downlink transmission on particular frequency resources on unlicensed spectrum, the base station 170 may listen to the wireless channel on those frequency resources to determine whether the channel is already occupied. If the base station 170 detects another transmission, the base station 170 will not send the downlink transmission on the allocated resources. If the base station 170 determines that the channel is unoccupied, the base station 170 acquires the channel and sends the downlink transmission.

A transmission that is sent using an LBT protocol may be referred to as an "LBT-based transmission". Different LBT protocols may be used to perform LBT-based transmissions, e.g. LBT category 2 ("LBT CAT2"), LBT category 4 ("LBT CAT4"), etc. An "LBT failure" is said to occur when the channel is occupied. When LBT failure occurs, the transmission is cancelled or deferred. The time delay incurred because of an LBT failure is referred to as blocking time.

Uplink Transmission of HARQ Feedback in Unlicensed Spectrum

A base station 170 may send a downlink transmission to the UE 110 that schedules an uplink transmission in unlicensed spectrum of a wireless channel. The downlink transmission may indicate an uplink time-frequency resource partition on which the uplink transmission may be sent. For example, the base station 170 may transmit DCI to a UE 110. The DCI may schedule a transmission of one or multiple TBs in the downlink data channel, and the DCI may also allocate an uplink resource (e.g. PUCCH resource) in which the UE 110 can transmit HARQ feedback corresponding to the TB(s). An example is DCI 360 illustrated in FIG. 7. However, on an unlicensed CC, the UE 110 may not be able to gain channel access to transmit the HARQ feedback on the allocated uplink time-frequency resource partition. For example, if the UE 110 is to transmit the HARQ feedback in LBT-based transmission on the preconfigured resource using an LBT protocol, and if the UE 110 determines that the wireless channel at the frequency region of the allocated uplink time-frequency resource partition is already occupied, then the UE 110 will not send the LBT-based transmission on the allocated uplink time-frequency resource partition. The UE 110 may try to send the HARQ feedback in a later transmission instead. In an asynchronous HARQ process, a retransmission may not occur for several subframes if there is a blocked or lost HARQ feedback transmission because of LBT failure or because of persistent collisions with the transmissions of hidden nodes on the unlicensed CC. Even if the base station 170 were to allocate multiple uplink time-frequency resources in the time domain, e.g. in the PUCCH, but on the same frequency resources, the uplink transmissions may still be blocked/lost due to long occupancy of the channel, which may lead to triggering an ARQ retransmission at a higher network layer. For example, an ARQ retransmission of the associated protocol data unit (PDU) may be triggered by the radio link control (RLC) sublayer, which would result in potentially significant delays and throughput loss.

Embodiments below aim to provide more reliable LBT-resilient mechanisms for the resource allocation of the uplink control channel and the transmission of the HARQ feedback in the unlicensed spectrum, e.g. by exploiting the frequency dimension.

In some embodiments, multiple uplink time-frequency resources are allocated on different frequency partitions for sending uplink control information, such as the HARQ feedback. Based on the LBT results, the UE 110 may select among the different uplink time-frequency resources for which the LBT results were successful to transmit the HARQ feedback. A set of uplink time-frequency resources allocated to a UE on a frequency partition will be referred to as an uplink time-frequency resource partition. For example, an uplink time-frequency resource partition may be a PUCCH resource allocated to the UE on a frequency partition to transmit uplink control information, such as HARQ feedback, in which case the PUCCH resource may also be called a PUCCH time-frequency resource partition. Different frequency partitions may be in a same BWP, in which case the frequency partitions may be called subbands. Different frequency partitions may also or instead be in different BWPs.

Figure 9:
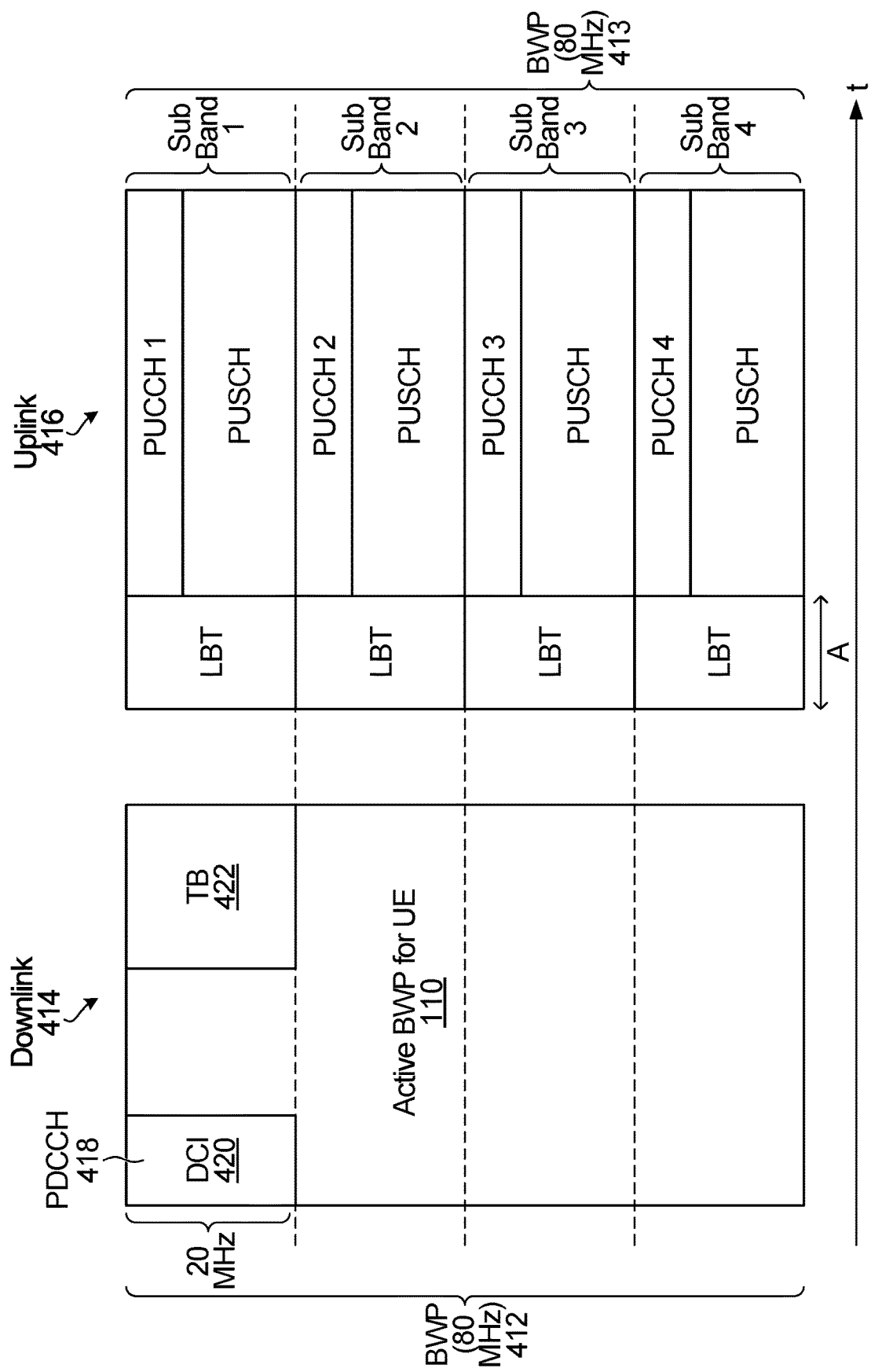
FIGS. 9 to 13 illustrate examples of a plurality of uplink time-frequency resources partitions for use in sending uplink control information.

As an example, FIG. 9 illustrates a downlink BWP 412 and a corresponding uplink BWP 413, both of which are active for UE 110, and both of which are implicitly paired in an unpaired spectrum. The CC or BWP 412 has a bandwidth of 80 MHz and may be called "wideband" because the bandwidth is greater than 20 MHz, which is the channel bandwidth of legacy WLAN. The BWP 412 includes downlink time-frequency resources 414 on which the UE 110 may receive downlink transmissions from the base station 170. BWP 413 is also illustrated as having a bandwidth of 80 MHz, but this need not be the case. For example, BWPs 412 and 413 may be aligned in terms of central frequency, but may have different bandwidths. For example, BWP 413 may only have a bandwidth of 60 MHz. BWP 413 includes uplink time-frequency resources 416 on which the UE 110 may send uplink transmissions to base station 170. The uplink time-frequency resources 416 may or may not occur immediately after the downlink time-frequency resources 414. For example, the uplink time-frequency resources 416 may occur after a small time gap (e.g. between 16 and 25 µs) from the downlink time-frequency resources 414. The BWP 413 is partitioned into four adjacent frequency subbands or frequency regions, respectively labelled subband 1, subband 2, subband 3, and subband 4. Each subband spans a frequency region of 20 MHz. A PDCCH 418 in one of the subbands includes DCI 420. The DCI 420 schedules a downlink transmission of a TB 422 to UE 110 in a PDSCH. The DCI 420 also allocates four uplink time-frequency resource partitions, which in FIG. 9 are four PUCCHs on which the UE 110 may send HARQ feedback corresponding to the TB 422. Each one of the four PUCCHs is in a respective subband, i.e. in a respective frequency partition, and the PUCCHs are respectively labelled PUCCH 1, PUCCH 2, PUCCH 3, and PUCCH 4. The HARQ feedback is sent in the uplink LBT-based transmission using one or more of the allocated subbands if LBT corresponding to the subbands succeeds. Therefore, before sending the uplink transmission carrying the HARQ feedback, the UE 110 listens to the wireless channel on the frequency region of each of the four subbands during a period of time 'A'. In some embodiments, the UE 110 listens to the wireless channel on each subband for the same amount of time, e.g., using the preset LBT CAT2 duration (A=25 µs) or using the same randomly generated contention window as in LBT CAT4. In some other embodiments, the UE listens to the wireless channel on one subband for a period A determined based on a randomly generated contention window as in LBT CAT4, but starts listening to the wireless channel on each other subband for a short preset duration, as in LBT CAT2, immediately before the uplink transmission starting point.

Figure 10:
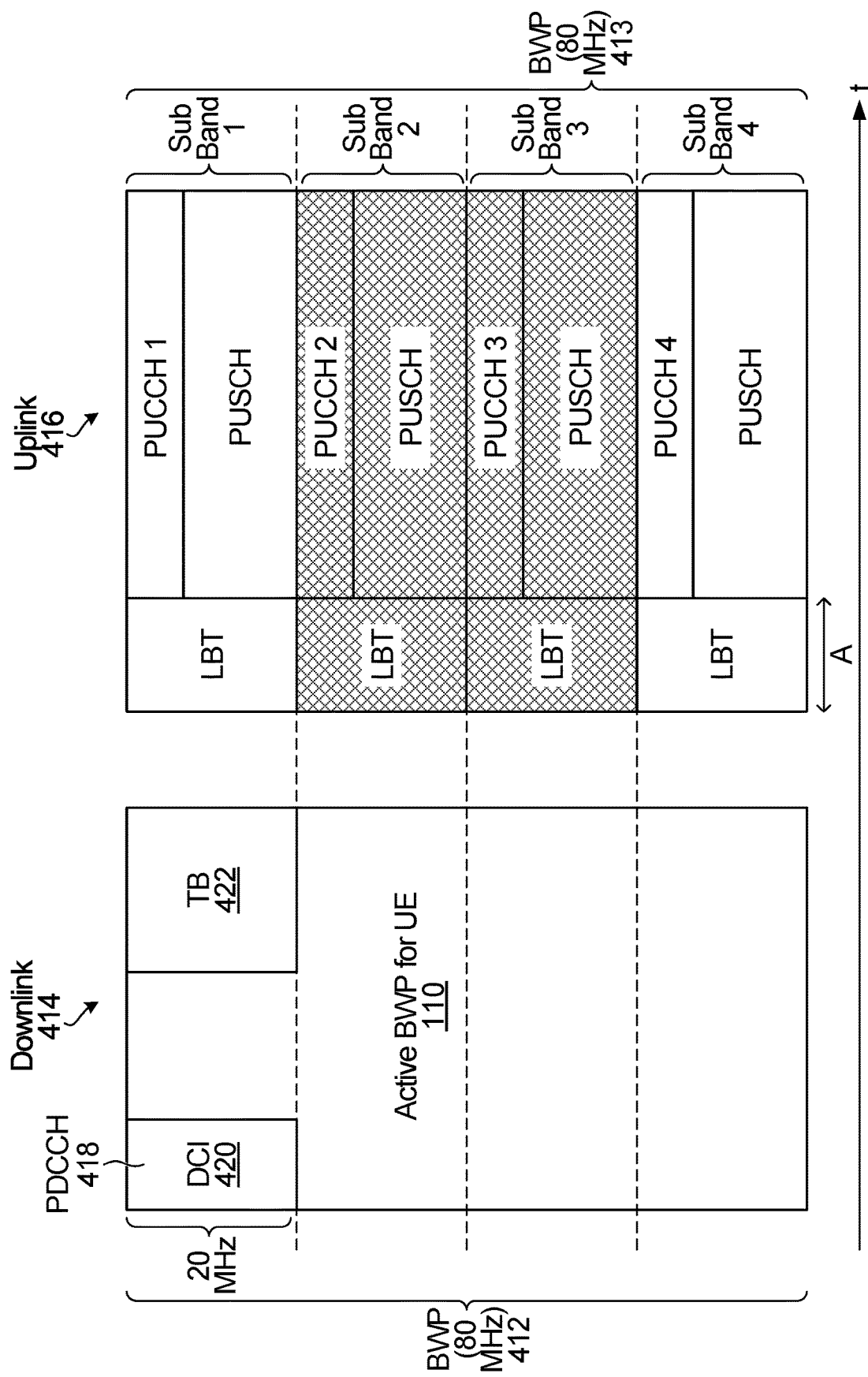

FIG. 10 illustrates an example in which the UE 110 determines that the wireless channel is already occupied on the frequency regions of subbands 2 and 3, and so the uplink transmission cannot be sent on these subbands. Cross-hatching is shown in subbands 2 and 3 in FIG. 10 because the uplink transmission cannot be sent on subbands 2 and 3. However, the UE 110 determines that the channel is unoccupied on the frequency regions of subbands 1 and 4, and so the uplink transmission may be sent on subband 1 or subband 4, or possibly on both subbands. By allocating multiple uplink time-frequency resource partitions on respective frequency regions, e.g. by configuring PUCCH 1, PUCCH 2, PUCCH 3, and PUCCH 4 in FIGS. 9 and 10, it may be more likely that the UE 110 will be able to transmit the uplink transmission on allocated time-frequency resources.

Because the base station 170 does not know the subband on which the HARQ feedback will arrive, if any, the decoder 266 of the base station 170 performs blind decoding of the allocated uplink time-frequency resource partitions, e.g. by attempting to decode the PUCCH on each subband and selecting the uplink control information on which decoding is successful. Blind decoding may also include identifying which type of uplink control information (UCI) has been transmitted by the UE on the allocated PUCCH time-frequency resource per subband. If decoding is not successful on the preconfigured uplink time-frequency resource of each subband, then the HARQ feedback may not have been transmitted because all subbands were occupied, or the transmission carrying the HARQ feedback may have collided with the transmission of a hidden node.

When the UE 110 determines that the wireless channel for sending the uplink transmission is unoccupied in more than one allocated uplink time-frequency resource partition, e.g. as in FIG. 10, then different options are possible. The UE 110 may send the uplink transmission on more than one of the unoccupied allocated uplink time-frequency resource partitions. Alternatively, the UE 110 may select only one of the unoccupied allocated uplink time-frequency resource partitions to send the uplink transmission. The resource partition selected may be random or based on a preconfigured order, e.g. select the resource partition on subband 1 before selecting the resource partition on subband 4.

In some embodiments, different resource partitions may be prioritized per UE by configuring different offsets for the uplink transmission start of the UE's uplink transmission on each subband. When an offset is applied on a subband, the start of the uplink transmission on that subband is offset from the pre-configured start of the time-frequency resource allocated to that UE on that subband. The offset may be implemented in different ways. In one implementation: the offset corresponding to a particular subband indicates the start time of the uplink transmission on that subband such that the start time is later than the pre-configured start of the time-frequency resources allocated to that UE on that subband if the offset is non-zero; the LBT listening period occurs prior to the start time and ends at the start time; if the channel is unoccupied at the end of the LBT listening period, then the uplink transmission may be sent.

Different offset values correspond to different priorities. When offsets are used, the UE 110 will typically transmit on the first resource that is available for use, i.e., the available subband (as determined by a successful LBT) with the shortest time offset. For example, if the UE 110 determines that the frequency regions of subbands 1 and 4 are unoccupied, but UE 110 is preconfigured using offsets to have to start a potential uplink transmission on subband 4 one or more OFDM symbols after the start of a potential uplink transmission on subband 1, then the UE 110 may send the uplink transmission on subband 1 first because subband 1 is available to the UE 110 first. The offset values may have smaller time granularity than the OFDM symbol such as the CCA slot duration, e.g., 9 μs in the 5 GHz band. In the case of an offset of a non-integer symbol duration, CP extensions can be used to allow for starting the transmission between the OFDM symbol boundaries.

In some embodiments, different subbands may be prioritized by setting in DCI 420 different LBT priority classes/access categories for each subband, which ultimately affects how long the UE 110 needs to listen using CAT4 LBT before being able to send the uplink transmission. For example, if UE 110 was configured to listen longer in the frequency region of subband 4 than in the frequency region of subband 1, i.e. time period A was longer for subband 1 than for subband 4, then the UE 110 may just send the uplink transmission on subband 1 first. Prioritizing different subbands is also discussed later in the context of prioritizing one UE over another UE.

In some embodiments, the UE 110 performs LBT independently on each subband, possibly in parallel, e.g. as illustrated in FIGS. 9 and 10 during time period A. In other embodiments, the UE 110 performs hierarchical LBT, e.g. like in (e)LAA LBT type B for DL/type 2 for UL. For example, during time period A in FIG. 9, the UE 110 may first listen only on the frequency region of subband 1 to determine whether the channel is unoccupied. If the UE 110 determines the wireless channel is unoccupied on the frequency region of subband 1, then just before the UE 110 finishes the LBT period, the UE 110 checks the frequency region of each of the other three subbands for a short period of time. If the UE 110 determines that one or more other subbands is also unoccupied, then the UE 110 may acquire not just the allocated uplink time-frequency resource partition in subband 1, but also the allocated uplink time-frequency resource partitions of one or more other unoccupied subbands and perform a wider band uplink transmission. In such case, for instance, additional A/N feedback that is pending for HARQ processes transmitted in previous downlink bursts can be sent in the acquired other subbands.

In some embodiments, collisions between the PUSCH/PUCCH transmissions of different UEs on the same selected frequency region/subband of the BWP 412 may be mitigated or avoided using orthogonal frequency interlaces. PUCCH collisions may be further tolerated using orthogonality in the code domain, e.g. through the use of orthogonal cover codes.

Many variations of the embodiments described above in relation to FIGS. 9 and 10 are possible. The following is a non-exhaustive list of examples. The BWPs 412 and 413 do not have to be 80 MHz, but may be different bandwidths. The BWP 412 and/or 413 may be a portion of a larger BWP on the CC, e.g. BWP 412 may be an 80 MHz portion of a 160 MHz BWP. The bandwidth of the subbands need not be 20 MHz, and in general the bandwidth of the subbands may be different from each other. There may be more or fewer than four subbands. The DCI 420 and/or TB 422 may span more than one subband. The TB 422 may be in a different subband from the DCI 420. The LBT period A may be a different duration for different subbands, and in general the LBT period of different subbands may be parallel, may partially overlap in time, or may not be in parallel and not overlap in time at all. Although not shown in FIGS. 9 and 10, the base station 170 may also send the DCI 420 and associated downlink TB transmission 422 via an LBT-based downlink transmission. The DCI 420 and TB 422 may be sent in a single downlink burst after the LBT period reveals that the channel is unoccupied. Alternatively, the DCI 420 and TB 422 may be sent via two separate LBT-based downlink transmissions. In the embodiments illustrated in FIGS. 9 and 10, the downlink transmissions of the DCI 420 and TB 422 are LBT-based downlink transmissions sent at the allocated time because the channel is unoccupied, but more generally this need not be the case.

Figure 11:
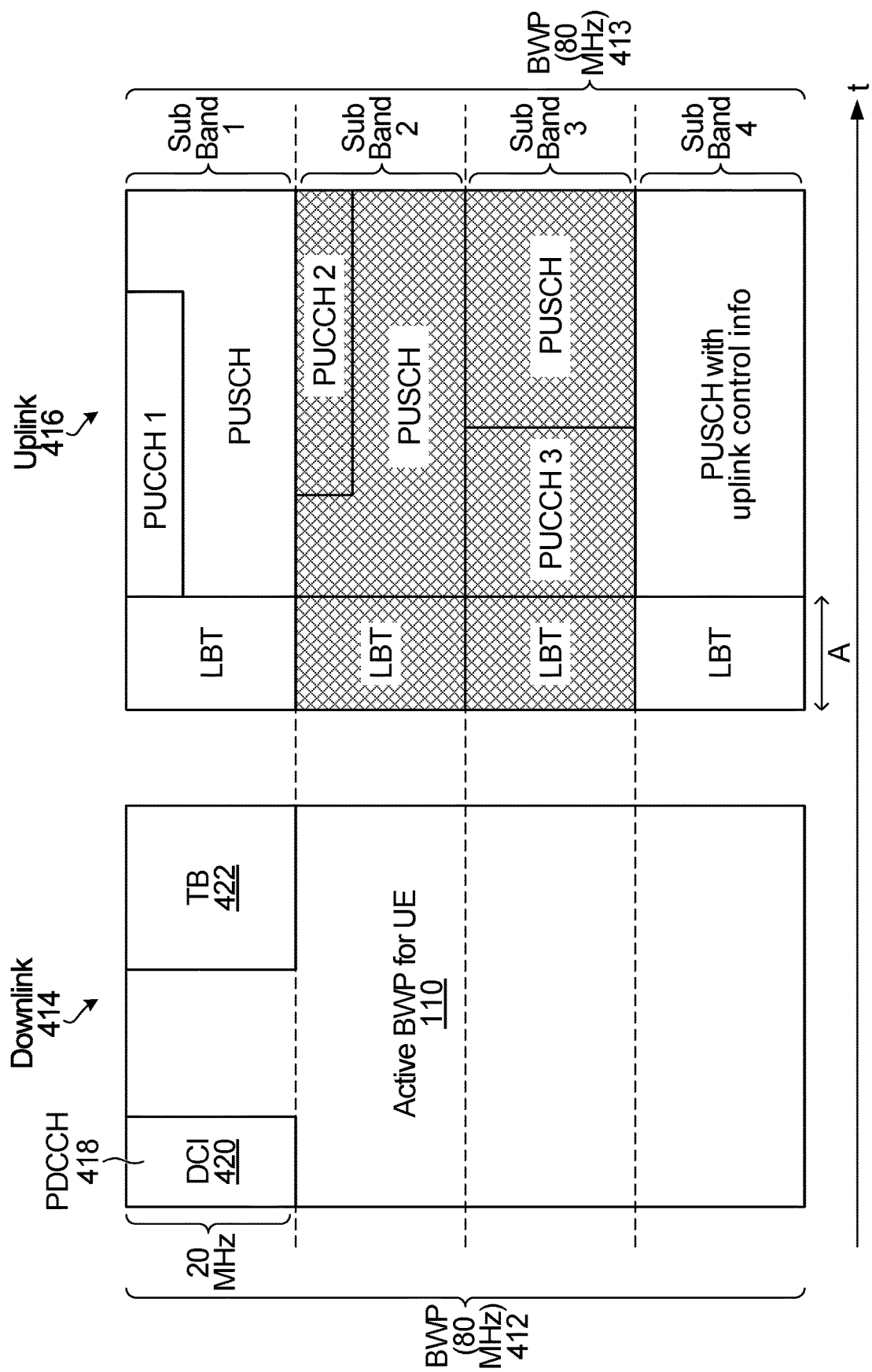

FIG. 11 illustrates a variation of FIG. 10 in which there is no separate PUCCH allocated in subband 4. Instead, control information transmitted in an uplink transmission in subband 4 is multiplexed with the data in the PUSCH of subband 4. In the example in FIG. 11, the UE 110 may prioritize sending its uplink transmission of control information in PUCCH 1 of subband 1 over using subband 4, because the uplink control information would be multiplexed within PUSCH in subband 4. Alternatively, the UE 110 may prioritize sending its uplink transmission in subband 4, by multiplexing its control information with its data transmission.

FIG. 11 also illustrates PUCCH 1, PUCCH 2, and PUCCH 3 at different locations in their respective subbands, in order to emphasize that in embodiments herein the PUCCHs do not have to be at the same location in each subband. Moreover, the resource partitions depicted may be logical partitions.

Figure 12:
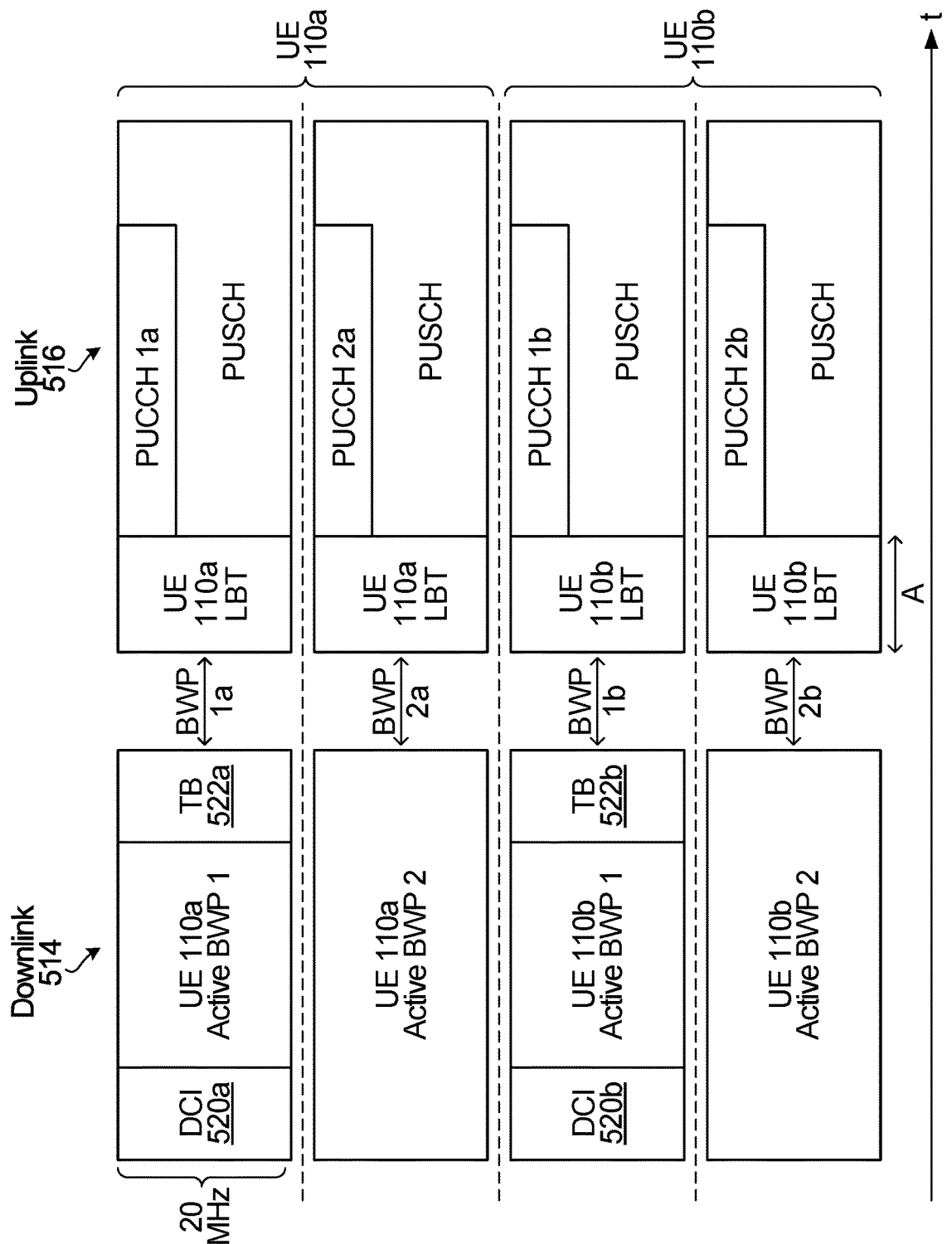

In other embodiments, multiple uplink time-frequency resource partitions may be allocated on multiple active BWPs. For example, a base station 170 may configure a UE 110 with multiple PUCCH resources on multiple active BWPs. As an example, FIG. 12 illustrates the time-frequency resources for two UEs 110*a* and 110*b* on the same CC. UE 110*a* is active on BWPs 1a and 2a, which are BWPs configured for UE 110*a* in the uplink and downlink. UE 110*b* is active on BWPs 1b and 2b, which are BWPs configured for UE 110*b* in the uplink and downlink. In FIG. 12, the BWPs 1a and 2a that are configured for UE 110*a* are illustrated as non-overlapping with the BWPs 1b and 2b that are configured for UE 110*b*. However, in general, BWPs 1a and 2a may overlap or coincide with BWPs 1b and 2b.

In FIG. 12, a TDD system is illustrated in which the downlink BWPs including downlink time-frequency resources 514 are paired with the uplink BWPs including uplink time-frequency resources 516. The uplink time-frequency resources 514 may or may not occur immediately after the downlink time-frequency resources 516. BWP 1a refers to first paired downlink and uplink BWPs configured for UE 110*a*, BWP 2a refers to second paired downlink and uplink BWPs configured for UE 110*a*, BWP 1b refers to first paired downlink and uplink BWPs configured for UE 110*b*, and BWP 2b refers to second paired downlink and uplink BWPs configured for UE 110*b*.

DCI 520*a* in BWP 1a schedules a downlink transmission of a TB 522*a* to UE 110*a*. The DCI 520*a* also allocates two uplink time-frequency resource partitions on which the UE 110*a* may send HARQ feedback corresponding to the TB 522*a*: PUCCH 1a in BWP 1a, and PUCCH 2a in BWP 2a. The HARQ feedback is sent via an LBT-based transmission, and so before sending the uplink transmission carrying the HARQ feedback, the UE 110*a* listens to the wireless channel on the frequency regions of both BWP 1a and BWP 2a during a period of time 'A'.

DCI 520*b* in BWP 1b schedules a downlink transmission of a TB 522*b* to UE 110*b*. The DCI 520*b* also allocates two uplink time-frequency resource partitions on which the UE 110*b* may send HARQ feedback corresponding to the TB 522*b*: PUCCH 1b in BWP 1b, and PUCCH 2b in BWP 2b. The HARQ feedback is sent via an LBT-based transmission, and so before sending the uplink transmission carrying the HARQ feedback, the UE 110*b* listens to the wireless channel on the frequency regions of both BWP 1b and BWP 2b during the period of time 'A'. Although not shown in FIG. 12, PUCCH 1a and 1b may be the same PUCCH on the same time-frequency resources, rather than different PUCCHs on different time-frequency resources. Similarly, in general PUCCH 2a and 2b may be the same PUCCH on the same time-frequency resources, or different PUCCHs possibly on different time-frequency resources. If the PUCCHs of different BWPs are on overlapping time-frequency resources, then orthogonal cover codes may be used to distinguish different transmissions on the overlapping time-frequency resources. If the PUCCHs of different BWPs are on different time-frequency resources, then this may be implemented using, e.g., orthogonal frequency interlaces. In general, the time-frequency resources used for transmissions to/from UE 110*a* may fully overlap, be coterminous with, partially overlap, or not overlap at all with the time-frequency resources used for transmissions to/from UE 110*b*.

Figure 13:
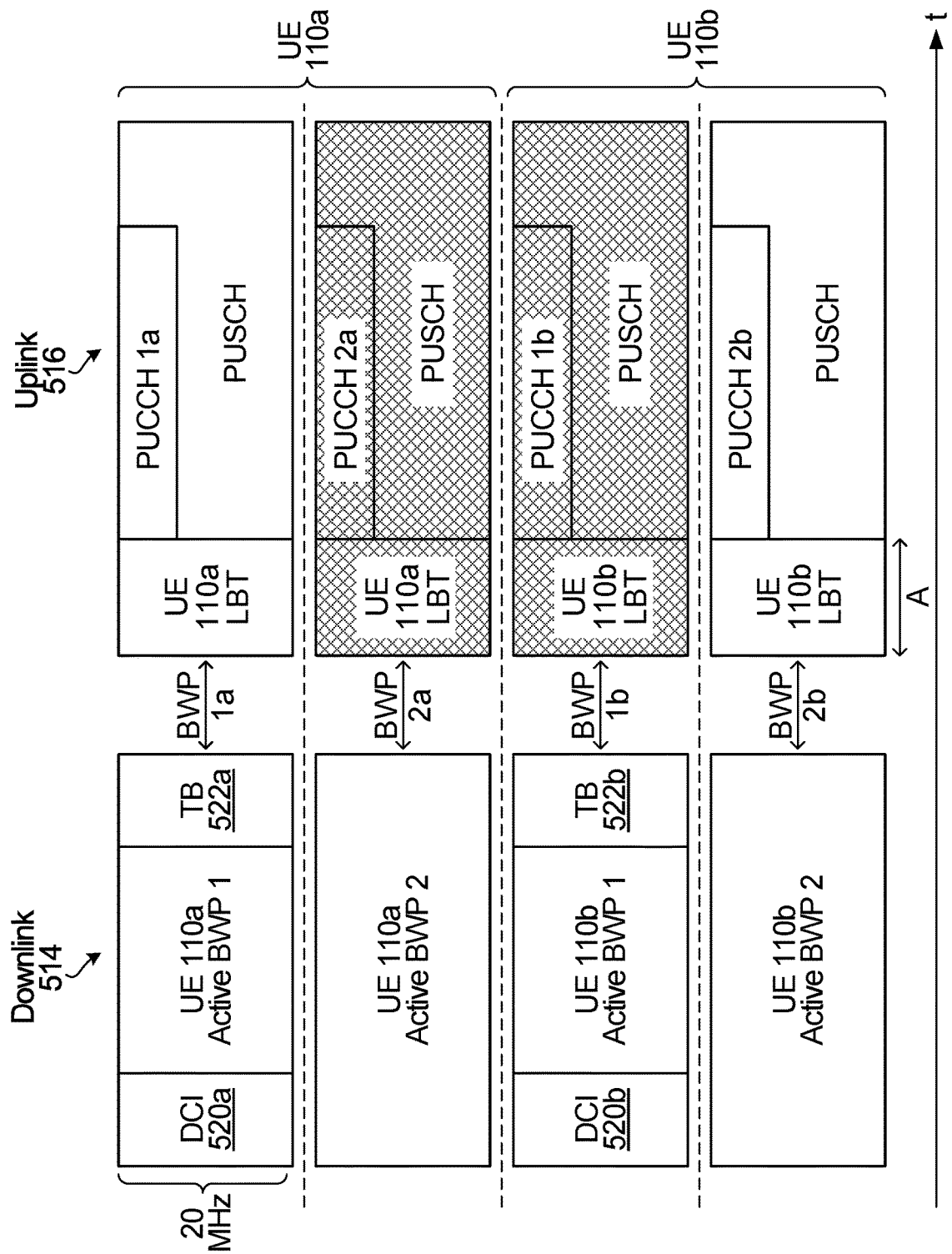

FIG. 13 illustrates an example in which the UE 110*a* determines that the wireless channel is already occupied in the frequency region of BWP 2a, and in which UE 110*b* determines that the wireless channel is already occupied in the frequency region of BWP 1b. Cross-hatching is shown to illustrate that the uplink transmission cannot be sent because the BWP is occupied. The UE 110*a* may therefore send its uplink transmission on the allocated uplink time-frequency resource partition in BWP 1a, and the UE 110*b* may send its uplink transmission on the allocated uplink time-frequency resource partition in BWP 2b. By allocating multiple uplink resources on respective different active BWPs for a UE, it may be more likely that the UE will be able to transmit the uplink transmission on allocated resources.

Because the base station 170 does not know the uplink time-frequency resource partition on which the HARQ feedback will arrive from each UE, if any, the decoder 266 of the base station 170 performs blind decoding on each uplink time-frequency resource partition. The base station 170 is therefore configured to perform blind detection of the PUCCH on the multiple PUCCH resources on the multiple active BWPs.

In some embodiments, UE 110*a* and/or UE 110*b* performs LBT independently on each of its active BWPs, possibly in parallel, e.g. as in FIGS. 12 and 13 during time period A. In other embodiments, UE 110*a* and/or 110*b* performs hierarchical LBT, e.g. like in LBT type B. For example, during time period A in FIG. 13, the UE 110*a* may first listen only on the frequency region of BWP 1a to determine whether the channel is occupied. If the UE 110*a* determines the channel is unoccupied, then just before the UE 110*a* finishes the LBT period, the UE 110*a* checks the frequency region of BWP 2a for a short period of time. In FIG. 13, the UE 110*a* determines the frequency region of BWP 2a is occupied, but if the UE 110*a* were to instead determine that the frequency region of BWP 2a was unoccupied, then the UE 110*a* may acquire not just the allocated uplink time-frequency resource partition on BWP 1a, but also the allocated uplink time-frequency resource partition on BWP 2a, and perform a wider band uplink transmission. In such case, for instance, additional A/N feedback that is pending for HARQ processes transmitted in previous downlink bursts can be sent in the acquired uplink time-frequency resource partition on BWP 2a.

If UE 110a were to determine that the channel for sending the uplink transmission is unoccupied in more than one BWP, then different options are possible. UE 110a may send the uplink transmission on more than one unoccupied BWP. Alternatively, UE 110a may select only one of the unoccupied BWPs to send the uplink transmission. The BWP selected may be random or based on a preconfigured order, e.g. select BWP 1a before selecting BWP 2a. Similar remarks apply to UE 110b.

In some embodiments, different BWPs may be prioritized for UE 110a and/or 110b by configuring different offsets per UE for each of the BWPs. When an offset is applied by a UE on a BWP, the start of the uplink transmission by that UE on that BWP is offset from the pre-configured start of the time-frequency resources allocated to that UE on that BWP. An offset may be implemented in the ways described earlier. In one example, the start time of the uplink transmission is set later than the pre-configured start of the allocated time-frequency resources for that UE on that BWP, and the LBT listening period occurs immediately prior to the start time.

As an example, the base station 170 may configure UE 110a with a different offset for the starting point of its uplink transmission on each one of the multiple BWPs containing PUCCH resources. If UE 110a were to determine during LBT period A that BWP 1a and BWP 2a were both unoccupied, but UE 110a is preconfigured with an offset that causes UE 110a to wait a few OFDM symbols before UE 110a can start an uplink transmission on BWP 2a, then the UE 110a may send the uplink transmission on BWP 1a first. The likelihood/priority of an uplink transmission to occur on a given BWP decreases as the time offset increases. As another example, if the base station 170 configures uplink time-frequency resource partition "C" on one or more active BWPs, and the resource partition "C" is allocated to both UE 110a and UE 110b, then the base station 170 may use the offset to prioritize one UE over the other on resource partition "C". For example, if UE 110a were assigned an offset of zero OFDM symbols, and UE 110b were assigned an offset of three OFDM symbols, then if both UE 110a and UE 110b attempt to access the frequency region of the resource partition "C", UE 110a would transmit on uplink resources "C" first because it determined that the frequency region of the resource partition "C" was free. UE 110b would not transmit on uplink resources "C" because it would determine that resources "C" were occupied (by UE 110a). Offsets may be used to prioritize UE 110b over UE 110a on another allocated uplink time-frequency resource partition "D", such that when the channels are free, UE 110a would more likely transmit on uplink resource partition "C", and UE 110b would more likely transmit on uplink resource partition "D". It is noted that the offset values in these examples could have smaller time granularity than the OFDM symbol such as the CCA slot duration, e.g., 9 μs in the 5 GHz band. In the case of an offset of a non-integer symbol duration, CP extensions can be used to allow for starting the transmissions between the OFDM symbol boundaries.

Code-domain multiplexing of multiple UEs on the same uplink time-frequency resource partition on a given BWP may be used when the base station assigns the same time offset to the multiple UEs. For example, if the base station 170 uses the same time offset to equally prioritize UE 110a's transmission and UE 110b's transmission on the same uplink time-frequency resource partition on the same active BWP, then the base station 170 may configure UE 110a and UE 110b to use different code resources, e.g. UE 110a and 110b may be assigned different orthogonal cover codes.

Orthogonal frequency interlaces may also be used for multiplexing of multiple UEs on the same uplink time-frequency resource partition on a given BWP when the base station assigns the same time offset to the multiple UEs. For example, if the base station 170 uses the same time offset to equally prioritize UE 110a's transmission and UE 110b's transmission on the same uplink time-frequency resource partition on the same active BWP, then the base station 170 may configure UE 110a and UE 110b to use different orthogonal resource block interlaces, e.g. UE 110a and 110b may be multiplexed through interleaved frequency division multiple access (IFDMA).

Load balancing across BWPs may also be achieved by controlling priorities through time offsets. For example, the time offsets may assist load balancing by having different UEs differently prioritized across different BWPs so that UE uplink transmissions are more evenly spread across the different BWPs.

In some embodiments, if BWPs 1a and 2a overlap with BWPs 1b and 2b, then different BWPs may be prioritized for different UEs by setting (e.g. in DCI or RRC) different LBT priority classes/access categories for each UE for each BWP, which ultimately affects how long a UE needs to listen before being able to send an uplink transmission on a particular BWP. For example, BWP 1a and 1b may coincide and therefore be called "BWP 1", and BWP 2a and 2b may also coincide and therefore be called "BWP 2". If UE 110a was configured to listen longer on BWP 2 compared to BWP 1, i.e. time period A was longer for BWP 2 than for BWP 1, then the UE 110a may send the uplink transmission on BWP 1 first. UE 110b may be configured in the opposite manner, i.e. to listen longer on BWP 1 compared to BWP 2, in which case UE 110b may send its uplink transmission on BWP 2 first.

Many variations of the embodiments described above in relation to FIGS. 12 and 13 are possible. The following is a non-exhaustive list of examples. There may be more than two active BWPs. Each BWP does not have to be 20 MHz. Different active BWPs may have different bandwidths. Each time-frequency resource illustrated may be a portion of a larger BWP. The LBT period A may be a different duration for different active BWPs and/or different UEs. In general, the LBT period for different BWPs and/or for different UEs may be the same or different, may fully or partially overlap in time, or may not overlap in time at all. Although not shown in FIGS. 12 and 13, the base station 170 may also send the DCI 520a and/or 520b and associated downlink TB transmissions 522a and/or 522b via one or more LBT-based downlink transmissions. In the embodiments illustrated in FIGS. 12 and 13, the downlink transmission of the DCI 520a/520b and TB 522a/522b are LBT-based downlink transmissions sent at the allocated time because the channel is unoccupied, but more generally this need not be the case.

Orthogonal Frequency Interlacing

Figure 14:
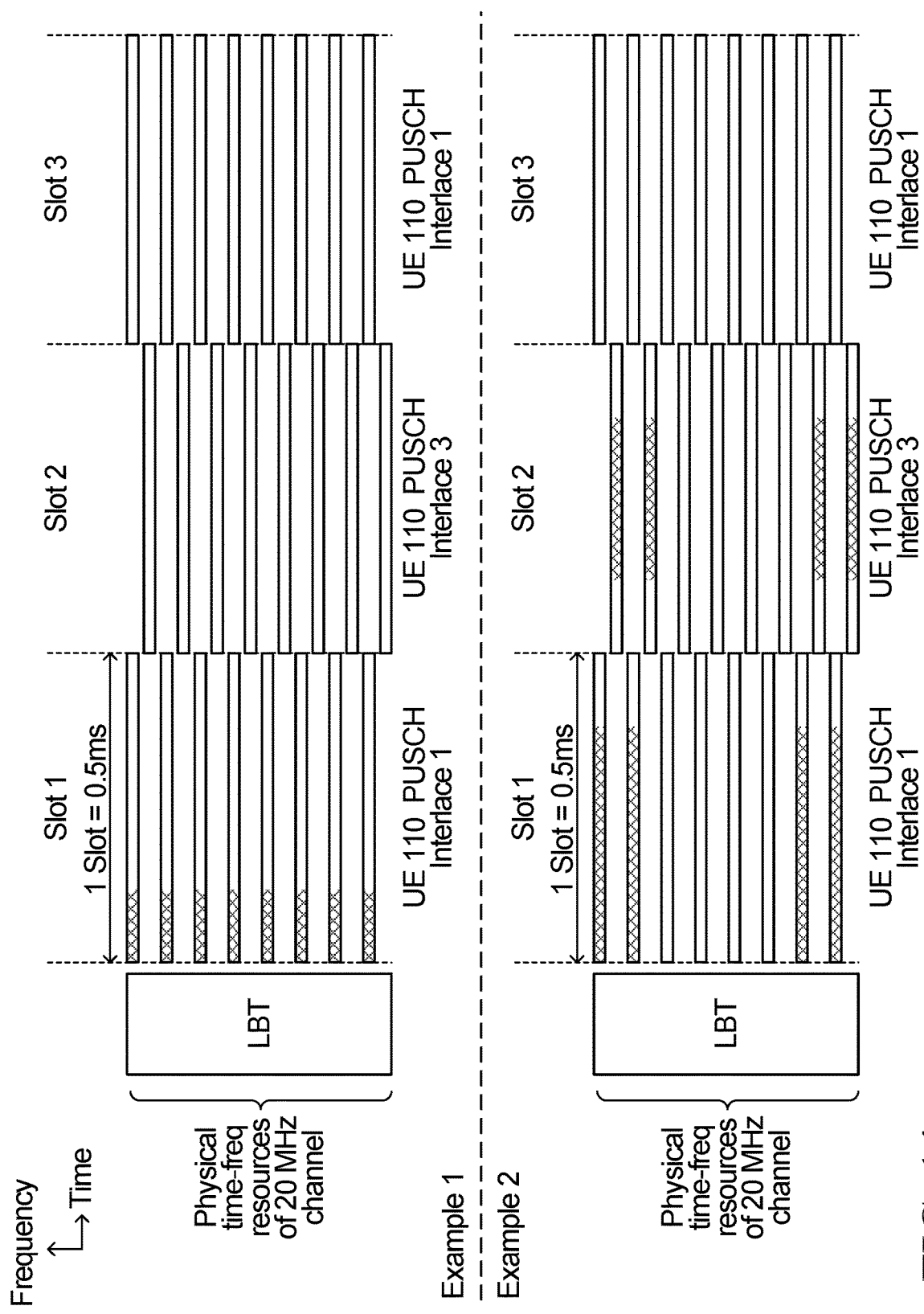
FIG. 14 illustrates two examples of orthogonal frequency interlacing.

Orthogonal frequency interlaces are likely to be used with uplink transmissions in the unlicensed spectrum to meet the regulatory requirements on the minimum occupied bandwidth (OCB) within the nominal bandwidth of the unlicensed channel. Two examples of orthogonal frequency interlacing are shown in FIG. 14. Example 1 in FIG. 14 illustrates three slots of an uplink burst on physical time-frequency resources of a 20 MHz channel. The horizontal axis represents time, and the vertical axis represents frequency. The rectangular boxes represent time-frequency resources on which the transmission is sent. The portions of rectangular boxes not in stippled lines represent a PUSCH transmission, i.e. an uplink transmission carrying data. The portions in stippled lines represent a PUCCH transmission, i.e., carrying uplink control information, which is multiplexed with the PUSCH in a TDM manner. The physical frequency resources, e.g., resource blocks, used for the uplink transmission are uniformly spaced in the frequency domain according to a pre-defined pattern or an "interlace". It is also noted that, in Example 1 in FIG. 14, the frequency resources in adjacent slots occupy different interlaces and thus are offset from each other and do not overlap in the frequency domain. In Example 1, a first set of frequency resources labelled "UE 110 Interlace 1" is present in slot 1, followed by a non-overlapping set of frequency resources labelled "UE 110 Interlace 3" in slot 2, followed by "UE 110 Interlace 1" in slot 3. The alternating pattern of "UE 110 Interlace 1" and "UE 110 Interlace 3" can be used to achieve inter-slot frequency hopping and may repeat itself for the whole uplink burst. Example 2 is a variation of Example 1 in which the PUCCH (shown in hatching) has a different format from that shown in Example 1. Specifically, the PUCCH in Example 2 occupies fewer frequency resources but more time resources in slot 1, and a PUCCH is also present in slot 2 of Example 2. Although it is desirable for the UE to use the same frequency interlace for the transmission of a PUCCH and a multiplexed PUSCH, it should be noted that the interlace-based transmissions of a PUCCH may occur without multiplexing with any PUSCH.

Dynamic Indication of Multiple Uplink Time-Frequency Resources

In some embodiments, the base station 170 pre-configures the UE 110 with one or more PUCCH resource sets per BWP through higher layer signaling, such as by using radio resource control (RRC) signaling, or by using remaining minimum system information (RMSI) if it is before the UE 110 is RRC-connected. A PUCCH resource set comprises a plurality of time-frequency resource partitions, each one of which is identified by a corresponding PUCCH resource index value. The base station 170 dynamically indicates the allocated PUCCH time-frequency resource partition to the UE in the DCI scheduling the PDSCH using a multi-bit (e.g. 2-bit or 3-bit) dedicated field, which is called the PUCCH resource indicator field. The indicator field value can map directly to the allocated PUCCH time-frequency resource partition within the PUCCH resource set that the UE has identified based on the uplink control information size and the number of symbols to be transmitted. In case the PUCCH resource set size is larger than the indicator field capability, the indicator field value can map to an allocated combination of PUCCH time-frequency resource partitions within the PUCCH resource set through a pre-defined rule, e.g., 1st+5th, 2nd+6th, etc.

In embodiments described earlier, e.g. in relation to FIGS. 9 to 13, multiple PUCCH resources are allocated to the UE simultaneously, e.g. in different subbands and/or in different BWPs. For example, in FIG. 9, four PUCCH time-frequency resources (PUCCH 1 to PUCCH 4) are allocated to the UE, with each allocated PUCCH in a respective subband. As another example, in FIG. 12, two PUCCH time-frequency resources (PUCCH 1a and PUCCH 2a) are allocated to UE 110*a*, with each PUCCH in a respective BWP. To support the allocation of multiple PUCCH time-frequency resource partitions simultaneously, the following features may be implemented:

(1) At least for a wideband BWP implementation, i.e. multiple PUCCHs allocated in different subbands of a BWP, like in FIG. 9, the PUCCH resource sets may be distributed across the bandwidth of the wideband BWP. That is, the base station 170 may avoid concentrating the PUCCH resource sets in a limited frequency region of the wideband BWP so that some PUCCH resources can be available on each subband, e.g. like in FIG. 9.

(2) Dynamic indication of multiple PUCCH time-frequency resource partitions, as explained below.

Dynamic indication of multiple PUCCH time-frequency resource partitions will first be explained in an implementation in which multiple PUCCH time-frequency resource partitions are allocated to the UE simultaneously across different BWPs, which will be referred to as cross-BWP allocation. In some embodiments, the base station 170 uses DCI for dynamic cross-BWP activation of a subset of the pre-configured uplink BWPs on which the multiple PUCCH resources will be indicated. For example, the base station 170 may dynamically indicate the allocated PUCCH time-frequency resource partitions to the UE 110 in the DCI scheduling the PDSCH using a Multi-PUCCH-Resource Indicator field. The Multi-PUCCH-Resource Indicator field is an example of a set of bits that may be sent in a downlink transmission to indicate the multiple allocated time-frequency resource partitions. The bitwidth of the set of bits may depend upon the maximum number of BWPs the UE 110 can be configured with in the serving cell. The set of bits includes a plurality of bit subsets. Each bit subset corresponds to a respective BWP. The order of the bit subsets from MSB to LSB may follow the order of occupied physical resource blocks (PRBs) in the frequency domain. Multi-PUCCH-Resource Indicator field bits containing 'Reserved' or 'Invalid' field values may be used for BWPs that are not intended for the PUCCH time-frequency resource allocation. If all combinations of Multi-PUCCH-Resource Indicator field bits are valid indicator values, then a bitmap may be used by the UE to extract the valid indicator bits from the Multi-PUCCH-Resource Indicator field for each active BWP. The bit map may be referred to as a Cross-BWP PUCCH Indication Bitmap. The bitmap may also be sent in the DCI.

Figure 15:
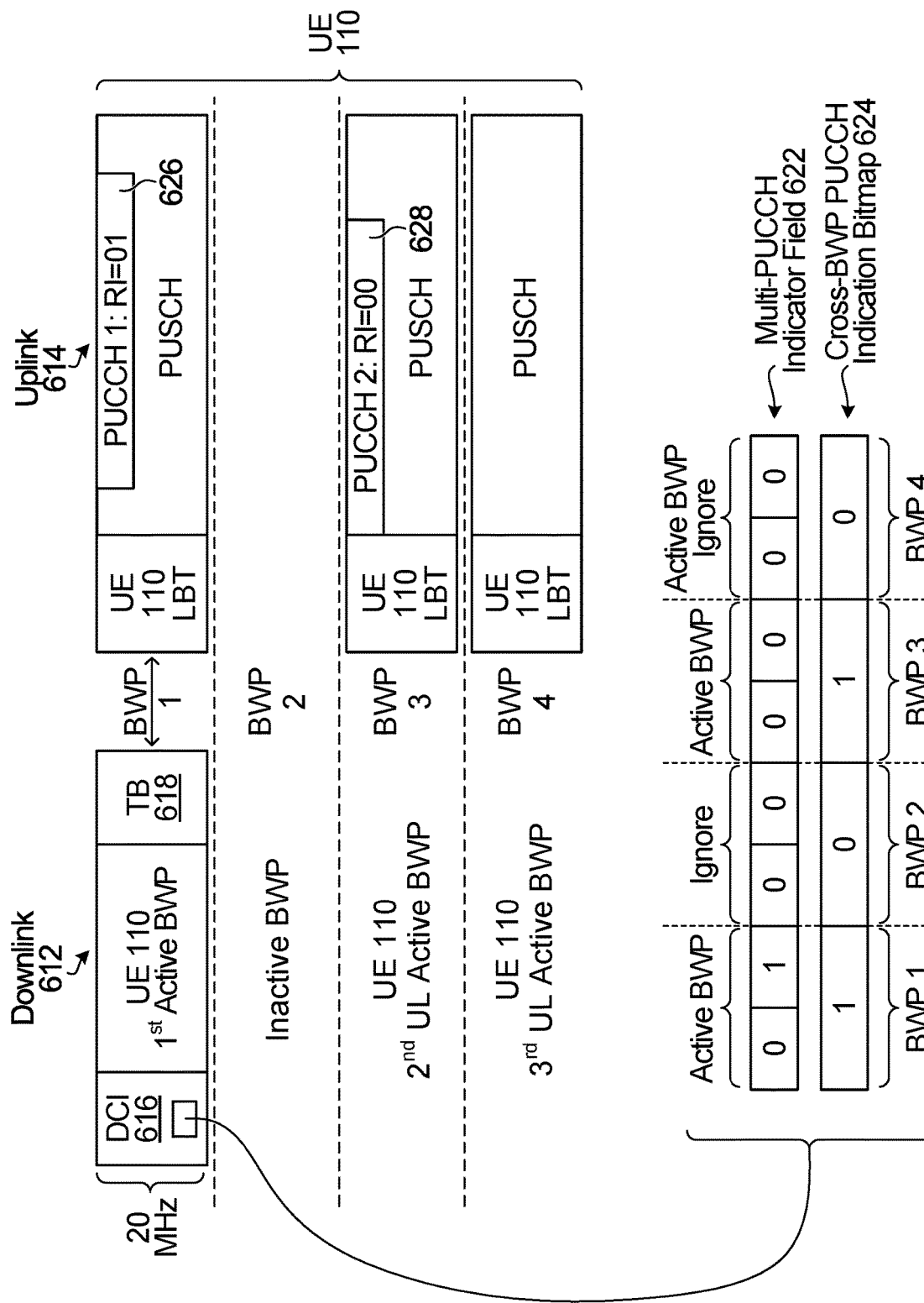
FIGS. 15 to 17 illustrate example ways to dynamically allocate multiple uplink control channels for a UE.

FIG. 15 illustrates one example of cross-BWP allocation. UE 110 is configured to operate on a maximum of four BWPs on a given CC. BWP 1 refers to first paired downlink and uplink BWPs configured for UE 110, BWP 2 refers to second paired downlink and uplink BWPs configured for UE 110, BWP 3 refers to third paired downlink and uplink BWPs configured for UE 110, and BWP 4 refers to fourth paired downlink and uplink BWPs configured for UE 110. However, at the time instance illustrated in FIG. 15, DCI 616 in BWP 1 activates BWPs 1, 3 and 4 for uplink transmission of UE 110. This is an example of cross-BWP activation of UL BWPs 3 and 4 through a DCI transmitted in BWP 1. DCI 616 in BWP 1 schedules a downlink transmission of a TB 618 to UE 110. The DCI 616 also allocates two PUCCH time-frequency resource partitions on which the UE 110 may send HARQ feedback corresponding to the TB 618: PUCCH 1 in BWP 1, and PUCCH 2 in BWP 3. The DCI 616 includes a Multi-PUCCH-Resource Indicator field 622 comprising eight bits. Each subset of two bits corresponds to a respective BWP. The bit combination in a subset indicates the location of the PUCCH in the BWP. A bit combination in a subset may be called a resource indicator (RI). The RI value corresponding to BWP 1 is "01", which maps to the particular location of PUCCH 1 shown at 626. The RI value corresponding to BWP 3 is "00", which maps to the particular location of PUCCH 2 shown at 628. The RI values corresponding to BWPs 2 and 4 are ignored because no PUCCH resources are allocated on these BWPs. Activated BWP 4 may be used for a PUSCH transmission according to DCI carrying an uplink grant. The Cross-BWP PUCCH Indication Bitmap 624, which is also sent in the DCI 616, indicates which RI values to ignore. In the specific example in FIG. 15, a value of '0' in the Cross-BWP PUCCH Indication Bitmap 624 means that the corresponding RI value in the Multi-PUCCH-Resource Indicator field 622 is to be ignored.

Figure 16:
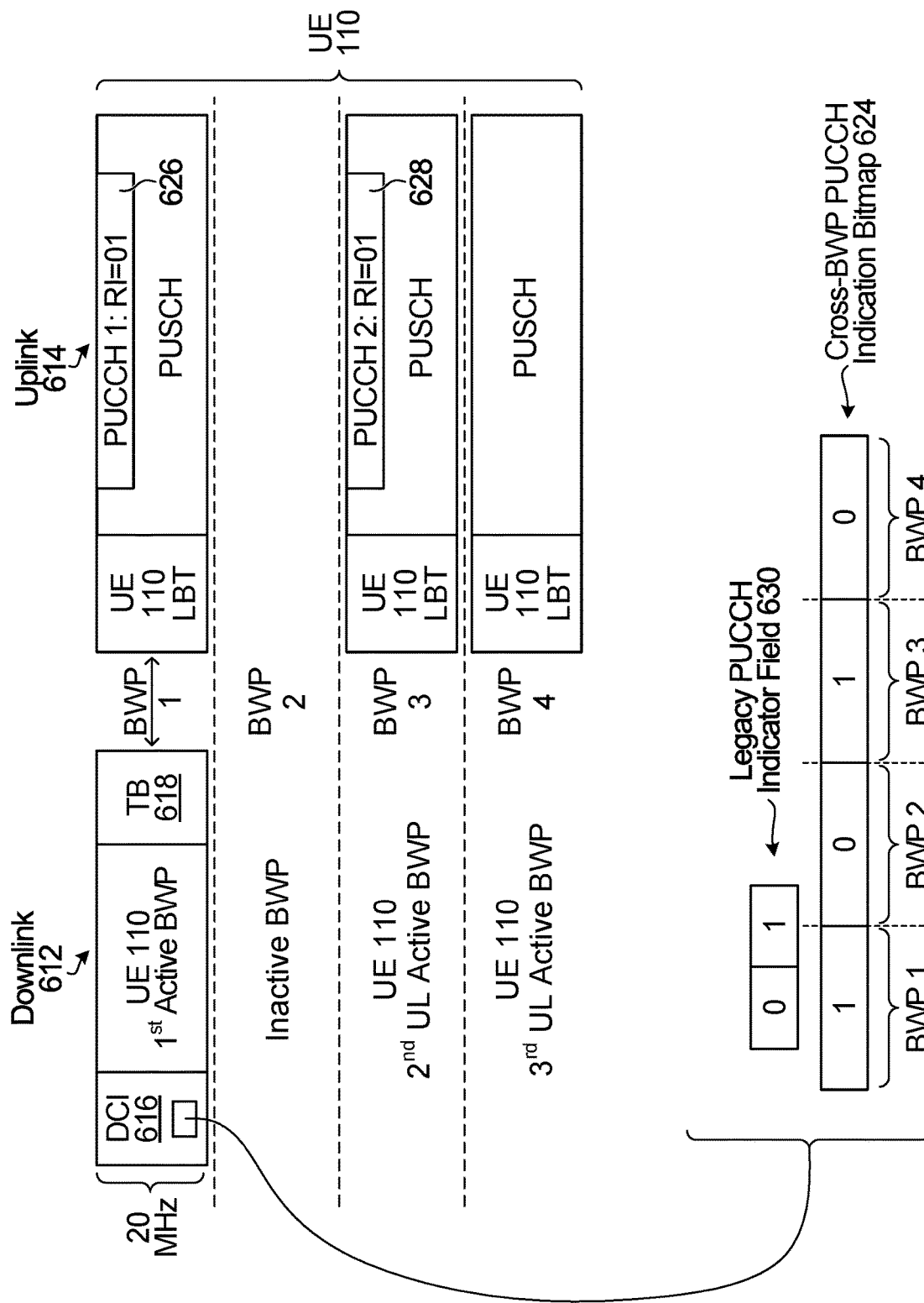

FIG. 16 illustrates a variation of FIG. 15 in which a legacy PUCCH Resource Indicator field 630 is instead used and applied to all or an intended subset of the activated uplink BWPs according to the Cross-BWP PUCCH indication bit map. In FIG. 16, the RI value for allocated PUCCH 1 and PUCCH 2 is the same: "01".

In some other embodiments of the implementation of Cross-BWP indication of the PUCCH resources, the UE may be configured, e.g., through RRC signaling, to receive PUCCH indications for a fixed number, m, of active uplink BWPs out of the UE's pre-configured set of uplink BWPs on a given CC. The DCI format carrying the Cross-BWP indication may therefore have m PUCCH resource indicator fields each corresponding to the respective UL BWP index indicated in the same DCI format. The base station may decide whether or not to configure the UE to receive the DCI format carrying the m PUCCH resource indicator fields based on a UE capability report provided earlier by the UE, e.g., through higher layer signaling. It is noted that configuring the UE to receive PUCCH indications for a fixed number of active uplink BWPs may save some signaling overhead in the DCI compared to the use of a bitmap especially when the number of pre-configured BWPs is large. It should be also noted that even though the UE may be configured to receive PUCCH indications for m active uplink BWPs, the base station my occasionally indicate either a reserved or an invalid BWP index, PUCCH resource indicator value, or a combination thereof, in the remaining fields of the m field of the DCI in case the number of intended BWPs for PUCCH resource indication is less than m.

In implementations in which PUCCH resource indications for m BWPs or the Cross-BWP PUCCH indication bit map and corresponding Multi-PUCCH-Resource Indicator field or legacy PUCCH Resource Indicator field are used, if the DCI format size matches other DCI formats, then a Cross-BWP Indication Flag may be used for the UE 110 to distinguish between the formats, which may reduce the complexity and energy consumption of UE blind detection.

Dynamic indication of multiple PUCCH time-frequency resource partitions is also possible in an implementation in which multiple PUCCH time-frequency resource partitions are allocated to the UE simultaneously across different subbands in a same BWP, e.g. in a same wideband BWP.

If multiple PUCCH time-frequency resource partitions are allocated to the UE simultaneously across different subbands in a same BWP, then the allocated PUCCH time-frequency resource partitions belong to the same BWP. Therefore, in some embodiments it is sufficient to indicate multiple unique time-frequency resource indexes within the appropriate PUCCH resource set that the UE will identify.

In some embodiments, to try to save indication overhead in DCI, a PUCCH Resource Bitmap may be used to indicate which PUCCH time-frequency resource partitions within the resource set are allocated to the UE. The PUCCH Resource Bitmap is an example of a set of bits that may be sent in a downlink transmission to indicate the multiple allocated time time-frequency resource partitions. The bit-width of the set of bits may depend upon the maximum size of the respective PUCCH resource set. The set of bits includes a plurality of bit subsets. Each bit subset may include only one bit. Each bit subset indicates an index corresponding to a PUCCH time-frequency resource partition.

By using the PUCCH Resource Bitmap, in some embodiments any combination of PUCCH time-frequency resource partitions can be indicated, which may be beneficial compared to a more restricted mapping of indicator field values in other systems.

In some embodiments in which a PUCCH Resource Bitmap is used, if the bitwidth of the PUCCH Resource Bitmap is set to the maximum size across all possible PUCCH resource sets, then bits of the PUCCH Resource Bitmap corresponding to out-of-range resource indexes for the identified PUCCH resource set may be ignored by the UE.

Figure 17:
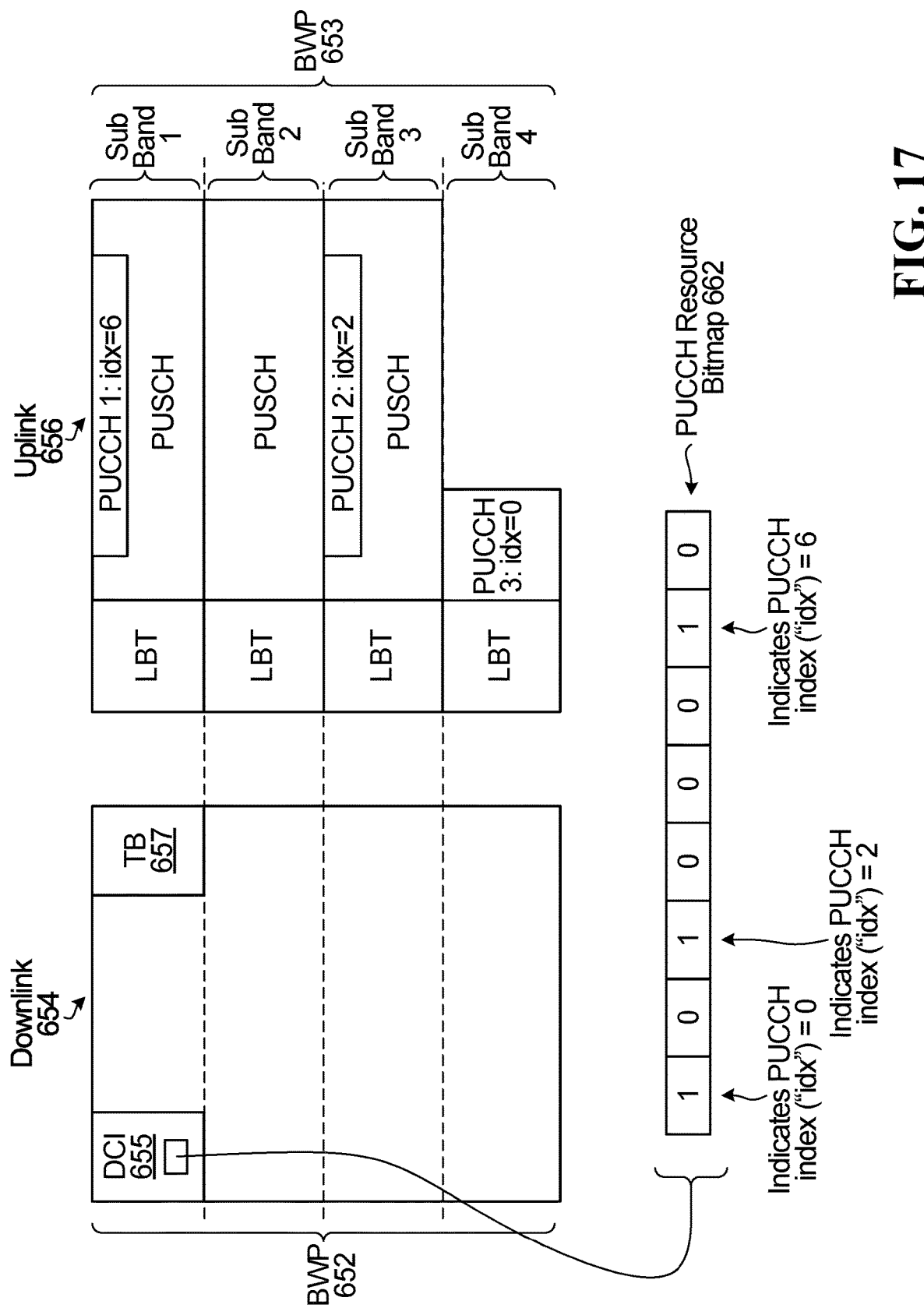

FIG. 17 illustrates one example of allocating multiple PUCCH time-frequency resource partitions across different subbands in a same BWP. A downlink BWP 652 and a corresponding uplink BWP 653 are illustrated, both of which are active for UE 110, and both of which are implicitly paired in an unpaired spectrum. The downlink BWP 652 includes downlink time-frequency resources 654 on which the UE 110 may receive downlink transmissions from the base station 170. Uplink BWP 653 includes uplink time-frequency resources 656 on which the UE 110 may send uplink transmissions to base station 170. The BWP 653 is partitioned into four adjacent frequency subbands, respectively labelled subband 1, subband 2, subband 3, and subband 4. DCI 655 schedules a downlink transmission of a TB 657 to UE 110 in a PDSCH. The DCI 655 also includes a PUCCH Resource Bitmap 662 that indicates the indices of three different allocated PUCCH time-frequency resource partitions in the BWP 653 across different subbands. In the specific example illustrated in FIG. 17, the PUCCH Resource Bitmap 662 indicates: index ("idx")=0 by setting the $1^{st}$ bit (MSB), which corresponds to PUCCH 3; idx=2 by setting the $3^{rd}$ bit, which corresponds to PUCCH 2, and idx=6 by setting the $7^{th}$ bit, which corresponds to PUCCH 1. It should be noted that the opposite order of bits in the PUCCH Resource Bitmap 662 may be used instead, i.e., numbering the bits starting from the LSB as the $1^{st}$ bit in the bitmap.

In the examples described above, e.g. in relation to FIGS. 15 to 17, the PUCCH time-frequency resource partitions dynamically indicated in the DCI may be preconfigured in advance using higher layer signaling, such as RRC signaling or RMSI Switching to Default BWP in Unlicensed Spectrum In some system implementations, e.g. for an unpaired-spectrum system such as TDD supporting new radio unlicensed ("NR-U") transmission, when there are paired uplink/downlink BWPs, the HARQ feedback is expected on the same BWP on which the downlink data transmission occurred.

In some system implementations, the UE 110 may have a default downlink/uplink BWP on which the UE 110 may wirelessly communicate with the base station 170. In these implementations, when the UE 110 is instead or also active and wirelessly communicating with the base station 170 on another downlink/uplink BWP that is different from the default BWP, then the UE may use an inactivity timer to determine whether the current active BWP is still active, e.g. timer 219 in FIG. 5. The inactivity timer may be started when the UE 110 receives an uplink and/or downlink assignment in the non-default active BWP via DCI, and then restarted/reset every time the UE 110 receives another uplink and/or downlink assignment in the non-default active BWP via additional DCI. If the inactivity timer expires before it is restarted/reset, then the BWP is considered to no longer be active, and the UE 110 switches back to wirelessly communicating with the base station on the default BWP. In some system implementations, the UE 110 is not expected to transmit HARQ feedback if the UE's active uplink BWP is switched between reception of the corresponding downlink assignment and the time allocated to transmit the HARQ feedback transmission, at least for the case of paired spectrum. Also, in some system implementations, it is up to the network to decide whether it is necessary to define a default uplink BWP in paired spectrum. Also, in some system implementations, support may be provided for HARQ retransmission across downlink and/or uplink BWPs when a UE's active downlink and/or uplink BWP is switched.

In at least some of the system implementations described above, the operation of the inactivity timer may be modified to more effectively accommodate wireless communication on unlicensed spectrum. For example, an LBT-based downlink transmission of DCI in a non-default active BWP may be delayed because the wireless channel is occupied, or the transmission may collide with another transmission on the wireless channel and not be successfully decoded or even recognized by the UE 110. In both of these cases, the inactivity timer may expire before it is reset from receipt of the DCI, which would cause the UE 110 to incorrectly decide that the BWP is no longer active and cause the UE 110 to switch back to the default BWP. Therefore, in some embodiments, the UE 110 is configured, e.g. by the network, to have a larger maximum inactivity timer value when operating on unlicensed spectrum. For example, when the UE 110 is active on a BWP on a CC in licensed spectrum, the UE 110 uses a maximum inactivity timer value x, and when the UE 110 is active on a BWP on a CC in unlicensed spectrum, the UE 110 uses a different maximum inactivity timer value y>x.

In some embodiments, if the downlink DCI transmission from the base station 170 on the active BWP in unlicensed spectrum is successfully received, then the UE 110 does not immediately restart the inactivity timer. Instead, the inactivity timer is restarted once the uplink burst of the scheduled uplink transmission is sent or started on the resources allocated in the DCI. By having the inactivity timer restarted in response to sending, after the LBT period, the scheduled uplink transmission, then if the uplink transmission is delayed in being sent because the wireless channel is occupied, the inactivity timer is not restarted during the period in which the wireless channel is occupied. The technique of delaying restarting the inactivity timer until the corresponding uplink burst is sent or started may be employed instead of having a larger maximum inactivity timer value y for unlicensed spectrum transmissions, or in addition to having a larger maximum inactivity timer value y for unlicensed spectrum transmissions. In the case of a larger maximum inactivity timer value y, the timer value y may be configured to be sufficiently large to also account for the potential blocking time due to the uplink LBT.

In some embodiments, the amount of blocking time due to LBT failure on the active BWP of an unlicensed CC may vary over time and across different active BWPs based on coexisting activities. For example, one unlicensed CC may be used by many different devices and thus such devices would experience a lot of blocking time, whereas another unlicensed CC may not be used often and thus the devices operating thereon my experience very little blocking time. Therefore, using a maximum inactivity timer value greater than that typically used for licensed spectrum may sometimes be inefficient. For example, it may be inefficient on particular unlicensed CCs during particular periods of time to have a larger maximum inactivity timer value y because there is little blocking time to account for. Therefore, in some embodiments, the UE 110 uses the same inactivity timer value (with or without applying a common extension) over time and across different BWPs and different unlicensed CCs, and the UE 110 dynamically accounts for the amount of time the medium access has been blocked on the respective BWP, at least for the uplink LBT-based transmission. This may be achieved by the UE 110 pausing its inactivity timer on a BWP for the time duration over which the uplink LBT fails. The inactivity timer therefore does not count during the blocking time associated with an uplink LBT failure. In this way, a BWP on a busy channel with uplink LBT failure and blocking time will be effectively associated with a greater inactivity timer value compared to a BWP on a less busy channel having less uplink LBT failure. As such, the behavior of the inactivity timer on a clear (mostly unoccupied) BWP falls back naturally to the intended behavior of the inactivity timer on a licensed BWP.

The embodiments described above, in which operation of the inactivity timer is modified and/or set to a new maximum inactivity timer value, may apply to scenario #1, scenario #2, and scenario #3 described below. The three scenarios below represent a non-exhaustive list. In the three scenarios below: grant-based (GB) self-scheduled refers to an uplink transmission that has been scheduled, e.g. in DCI, and the uplink transmission is on the same CC as the corresponding downlink transmission; GB cross-carrier scheduled refers to an uplink transmission that has been scheduled, e.g. in DCI, and the uplink transmission is on a different CC from the corresponding downlink transmission; channel occupancy time (COT) is the amount of time a transmission occupies the wireless channel; and maximum COT (MCOT) is the maximum amount of time a device is allowed to occupy a wireless channel that it has acquired.

Scenario #1—"GB self-scheduled uplink (UL) COT containing the PUCCH outside of the base station acquired MCOT". In this scenario, the base station acquires the wireless channel and sends the DCI allocating the PUCCH to be used by the UE to send the corresponding uplink transmission carrying HARQ feedback. The downlink and uplink transmissions are on the same CC. However, the one or more allocated time-frequency resource partitions for the PUCCH are outside the base station acquired MCOT. LBT CAT 4 may be performed by the UE to send the HARQ feedback on the PUCCH.

Scenario #2—"GB self-scheduled UL COT containing PUCCH within the base station acquired MCOT". In this scenario, the base station acquires the wireless channel and sends the DCI allocating the PUCCH to be used by the UE to send the corresponding uplink transmission carrying HARQ feedback. The downlink and uplink transmissions are on the same CC. The one or more allocated time-frequency resource partitions for the PUCCH are within the base station acquired MCOT. LBT CAT 2 may be performed by the UE to send the HARQ feedback on the PUCCH during the MCOT.

Scenario #3—"GB cross-carrier scheduled UL COT containing PUCCH". In this scenario, the base station sends the DCI allocating the PUCCH to be used by the UE to send the corresponding uplink transmission carrying HARQ feedback, e.g., on an active downlink BWP on a licensed CC. However, the one or more allocated time-frequency resource partitions for the PUCCH is scheduled on paired uplink BWP on an unlicensed CC which is different from the CC on which the DCI was sent in the downlink. LBT CAT 4 LBT may be performed by the UE to send the HARQ feedback on the PUCCH.

In embodiments above, systems and methods are provided for resource allocation. The systems and methods may provide more reliable transmission of a PUCCH in the unlicensed spectrum by using multiple frequency domain resource configurations. In some embodiments, the uplink active BWP is a single wideband BWP. In some embodiments, the UE is configured with multiple active BWPs. In some embodiments, a method is disclosed at the UE for modifying the timer-based switching mechanism of the active uplink BWP to the default uplink BWP. In some embodiments, the network configures the UE to use a greater maximum inactivity timer value in an unlicensed cell than that which is used in the licensed cells. In some embodiments, the inactivity timer for a BWP is not reset immediately upon receiving the DCI containing the uplink assignment, but is rather reset upon the transmission of the corresponding uplink burst. In some embodiments, the UE may use the same inactivity timer value, having a maximum inactivity timer value greater than that typically used for licensed spectrum or not, over time and across different BWPs and different unlicensed CCs, by trying to dynamically account for at least some of the amount of time the medium access has been blocked on the respective BWP, at least for the uplink LBT, so that a BWP on a busy channel may be effectively associated with a greater inactivity timer value compared to a BWP on a less busy channel. This may be achieved by the UE pausing its respective BWP switching timer for the time duration over which the uplink LBT has been failing.

Figure 18:
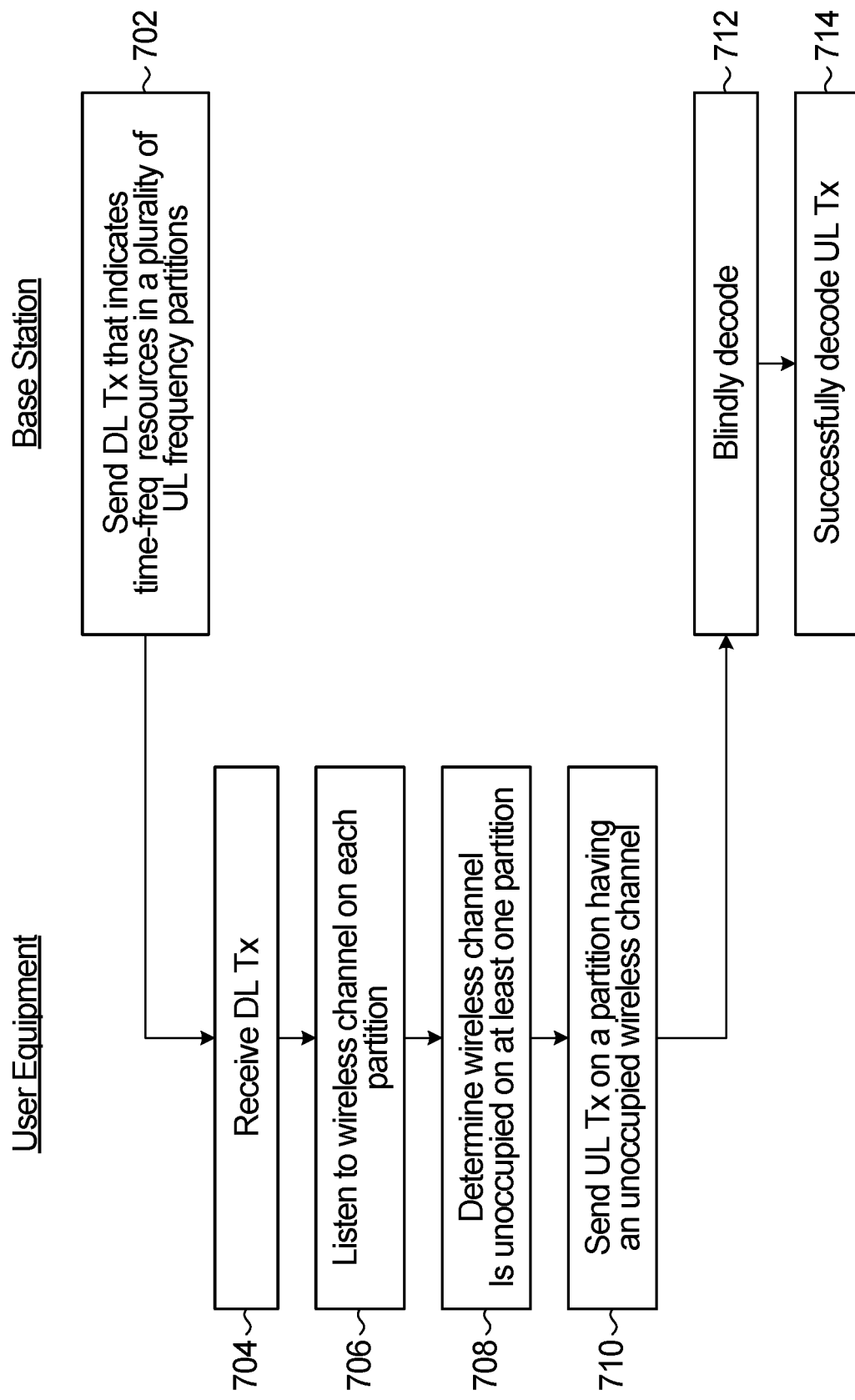
FIG. 18 is an example method performed by a user equipment and base station.

FIG. 18 is an example method performed by a base station and UE. In step 702, the base station sends a downlink transmission that indicates a plurality of uplink time-frequency resources on the unlicensed spectrum on which an uplink transmission may be sent. The plurality of time-frequency resources are in a plurality of uplink frequency partitions of the unlicensed spectrum. In step 704, the UE receives the downlink transmission. In step 706, for each partition of the plurality of uplink frequency partitions, the UE listens to the wireless channel in a frequency region of the partition to determine whether the wireless channel is unoccupied in the frequency region of the partition. In step 708, the UE determines that the wireless channel is unoccupied in the frequency region of at least one of the partitions. In step 710, the UE transmits the uplink transmission in at least one of the partitions for which the frequency region of the wireless channel is unoccupied. In step 712, the base station attempts blind decoding on the plurality of uplink time-frequency resources to obtain the uplink transmission in at least one of the partitions. In step 714, the base station successfully decodes the uplink transmission sent by the UE on time-frequency resources having an unoccupied wireless channel.

EXAMPLES

In view of, and in addition to the above, the following examples are disclosed.

Example 1

A method performed by a user equipment (UE), the method comprising: receiving a downlink transmission indicating a plurality of time-frequency resources on which an uplink transmission may be sent, the plurality of time-frequency resources being in a plurality of uplink frequency partitions of an unlicensed spectrum; for each uplink frequency partition of the plurality of uplink frequency partitions: listening to a wireless channel in a frequency region of the uplink frequency partition to determine whether the wireless channel is unoccupied in the frequency region of the uplink frequency partition; transmitting the uplink transmission in at least one of the uplink frequency partitions for which the frequency region of the wireless channel is unoccupied.

Example 2

The method of example 1, wherein the uplink transmission comprises hybrid automatic repeat request (HARD) feedback corresponding to a downlink transport block (TB).

Example 3

The method of example 1 or example 2, wherein the downlink transmission includes downlink control information (DCI) that indicates the plurality of time-frequency resources.

Example 4

The method of any one of examples 1 to 3, wherein the uplink transmission is scheduled on a control channel.

Example 5

The method of any one of examples 1 to 4, wherein the uplink frequency partitions overlap with each other in time, and do not overlap in frequency.

Example 6

The method of example 5, wherein the uplink frequency partitions are contiguous in the frequency domain.

Example 7

The method of any one of examples 1 to 6, wherein the uplink frequency partitions are in a same bandwidth part (BWP).

Example 8

The method of example 7, wherein the BWP is a wideband BWP.

Example 9

The method of any one of examples 1 to 6, wherein at least some of the uplink frequency partitions are in different BWPs.

Example 10

The method of any one of examples 1 to 9, comprising determining that the wireless channel is unoccupied in the frequency region of at least two of the uplink frequency partitions, and selecting one of the at least two uplink frequency partitions on which to transmit the uplink transmission.

Example 11

The method of any one of examples 1 to 10, wherein a start of the uplink transmission is offset from a start of the time-frequency resources.

Example 12

The method of example 11, wherein the offset is different for different frequency regions.

Example 13

The method of any one of examples 1 to 12, wherein the downlink transmission includes a set of bits that indicate the plurality of time-frequency resources, wherein the set of bits comprises at least one bit subset.

Example 14

The method of example 13, wherein there are a plurality of bit subsets, and each bit subset of the plurality of bit subsets corresponds to a respective one of the uplink frequency partitions.

Example 15

The method of example 13 or 14, wherein a particular bit subset, that corresponds to a particular uplink frequency partition, indicates one of multiple preconfigured time-frequency resource locations in the particular uplink frequency partition.

Example 16

The method of any one of examples 13 to 16, wherein the downlink transmission further includes a bitmap that indicates whether one or more of the bit subsets is to be ignored by the UE.

Example 17

The method of any one of examples 13 to 17, wherein the uplink frequency partitions are in different BWPs, and each bit subset corresponds to a respective BWP of the BWPs.

Example 18

The method of any one of examples 13 to 16, wherein the uplink frequency partitions are frequency subbands on a BWP, wherein the set of bits indicates a plurality of indices, and wherein each index of the plurality of indices corresponds to a respective time-frequency resource location in the BWP.

Example 19

The method of example 18, wherein different indices correspond to time-frequency resource locations in different frequency subbands.

Example 20

A user equipment (UE) configured to perform the method of any one of examples 1 to 19.

Example 21

A user equipment (UE) comprising: a memory having processor-executable instructions stored thereon; a processor configured to execute the processor-executable instructions in order to cause the UE to perform the method of any one of examples 1 to 19.

Example 22

A UE comprising: a receiver to receive a downlink transmission indicating a plurality of time-frequency resources on which an uplink transmission may be sent, the plurality of time-frequency resources in a plurality of uplink frequency partitions of an unlicensed spectrum; a listen-before-talk (LBT) unit to, for each uplink frequency partition of the plurality of uplink frequency partitions: listen to a wireless channel in a frequency region of the uplink frequency partition to determine whether the wireless channel is unoccupied in the frequency region of the uplink frequency partition; a transmitter to transmit the uplink transmission in at least one of the uplink frequency partitions for which the frequency region of the wireless channel is unoccupied.

Example 23

A method performed by a base station, the method comprising: transmitting a downlink transmission indicating a plurality of time-frequency resources on which an uplink transmission may be sent, the plurality of time-frequency resources in a plurality of uplink frequency partitions of an unlicensed spectrum; performing blind decoding on the plurality of time-frequency resources to obtain the uplink transmission in at least one of the plurality of uplink frequency partitions.

Example 24

The method of example 23, wherein the uplink transmission comprises hybrid automatic repeat request (HARQ) feedback corresponding to a downlink transport block (TB).

Example 25

The method of example 23 or example 24, wherein the downlink transmission includes downlink control information (DCI) that indicates the plurality of time-frequency resources.

Example 26

The method of any one of examples 23 to 25, wherein the uplink transmission is scheduled on a control channel.

Example 27

The method of any one of examples 23 to 26, wherein the uplink frequency partitions overlap with each other in time, and do not overlap in frequency.

Example 28

The method of example 27, wherein the uplink frequency partitions are contiguous in the frequency domain.

Example 29

The method of any one of examples 23 to 28, wherein the uplink frequency partitions are in a same bandwidth part (BWP).

Example 30

The method of example 29, wherein the BWP is a wideband BWP.

Example 31

The method of any one of examples 23 to 28, wherein at least some of the uplink frequency partitions are in different BWPs.

Example 32

The method of any one of examples 23 to 31, wherein a start of the uplink transmission is offset from a start of the time-frequency resources.

Example 33

The method of example 32, wherein the offset is different for different frequency regions.

Example 34

The method of any one of examples 23 to 33, wherein the downlink transmission includes a set of bits that indicate the plurality of time-frequency resources, wherein the set of bits comprises at least one bit subset.

Example 35

The method of example 34, wherein there are a plurality of bit subsets, and each bit subset of the plurality of bit subsets corresponds to a respective one of the uplink frequency partitions.

Example 36

The method of example 34 or 35, wherein a particular bit subset, that corresponds to a particular uplink frequency partition, indicates one of multiple preconfigured time-frequency resource locations in the particular uplink frequency partition.

Example 37

The method of any one of examples 34 to 36, wherein the downlink transmission further includes a bitmap that indicates whether one or more of the bit subsets is to be ignored by a UE.

Example 38

The method of any one of examples 34 to 37, wherein the uplink frequency partitions are in different BWPs, and each bit subset corresponds to a respective BWP of the BWPs.

Example 39

The method of any one of examples 34 to 36, wherein the uplink frequency partitions are frequency subbands on a BWP, wherein the set of bits indicates a plurality of indices, and wherein each index of the plurality of indices corresponds to a respective time-frequency resource location in the BWP.

Example 40

The method of example 39, wherein different indices correspond to time-frequency resource locations in different frequency subbands.

Example 41

A base station configured to perform the method of any one of examples 23 to 40.

Example 42

A base station comprising: a memory having processor-executable instructions stored thereon; a processor configured to execute the processor-executable instructions in order to cause the base station to perform the method of any one of examples 23 to 40.

Example 43

A base station comprising: a transmitter to transmit a downlink transmission indicating a plurality of time-frequency resources on which an uplink transmission may be sent, the plurality of time-frequency resources in a plurality of uplink frequency partitions of an unlicensed spectrum; a decoder to performing blind decoding on the plurality of time-frequency resources to obtain the uplink transmission in at least one of the plurality of uplink frequency partitions.

Example 44

A method performed by a user equipment (UE), the method comprising: wirelessly communicating with a base station in a first bandwidth part (BWP) of an unlicensed spectrum; upon expiry of an inactivity timer, instead wirelessly communicating with the base station in a second BWP different from the first BWP; wherein a maximum value of the inactivity timer is larger than a corresponding inactivity timer maximum value used when wirelessly communicating in at least one other BWP different from the first BWP.

Example 45

The method of example 44, wherein the maximum value of the inactivity timer is larger than a corresponding inactivity timer maximum value used when wirelessly communicating in licensed spectrum.

Example 46

The method of example 44 or 45, wherein the inactivity timer is restarted in response to sending, after a listen-before-talk (LBT) listening period, an uplink transmission in the first BWP. The uplink transmission may have been scheduled by the base station.

Example 47

The method of any one of examples 44 to 46, wherein the inactivity timer is paused for a time duration over which an uplink LBT-based transmission fails.

Example 48

A user equipment (UE) configured to perform the method of any one of examples 44 to 47.

Example 49

A user equipment (UE) comprising: a memory having processor-executable instructions stored thereon; a processor configured to execute the processor-executable instructions in order to cause the UE to perform the method of any one of examples 44 to 47.

Example 50

A UE comprising: an inactivity timer; a transmitter; and a receiver; the UE configured to wirelessly communicate with a base station in a first bandwidth part (BWP) of unlicensed spectrum, and upon expiry of the inactivity timer, instead wirelessly communicate with the base station in a second BWP different from the first BWP; wherein a maximum value of the inactivity timer is larger than a corresponding inactivity timer maximum value used when wirelessly communicating in at least one other BWP different from the first BWP.

Example 51

A method performed by a user equipment (UE), the method comprising: wirelessly communicating with a base station in a first bandwidth part (BWP) of an unlicensed spectrum; upon expiry of an inactivity timer, instead wirelessly communicating with the base station in a second BWP different from the first BWP; wherein the inactivity timer is restarted in response to sending, after a listen-before-talk (LBT) listening period, an uplink transmission in the first BWP that was scheduled by the base station.

Example 52

The method of example 51, wherein a maximum value of the inactivity timer is larger than a corresponding inactivity timer maximum value used when wirelessly communicating in at least one other BWP different from the first BWP.

Example 53

The method of example 52, wherein the maximum value of the inactivity timer is larger than a corresponding inactivity timer maximum value used when wirelessly communicating in licensed spectrum.

Example 54

The method of any one of examples 51 to 53, wherein the inactivity timer is paused for a time duration over which an uplink LBT-based transmission fails.

Example 55

A user equipment (UE) configured to perform the method of any one of examples 51 to 54.

Example 56

A user equipment (UE) comprising: a memory having processor-executable instructions stored thereon; a processor configured to execute the processor-executable instructions in order to cause the UE to perform the method of any one of examples 51 to 54.

Example 57

A UE comprising: an inactivity timer; a transmitter; and a receiver; the UE configured to wirelessly communicate with a base station in a first bandwidth part (BWP) of unlicensed spectrum, and upon expiry of the inactivity timer, instead wirelessly communicate with the base station in a second BWP different from the first BWP; wherein the UE is configured to restart the inactivity timer in response to sending, after a listen-before-talk (LBT) listening period, an uplink transmission in the first BWP that was scheduled by the base station.

Example 58

A method performed by a user equipment (UE), the method comprising: wirelessly communicating with a base station in a first bandwidth part (BWP) of an unlicensed spectrum; upon expiry of an inactivity timer, instead wirelessly communicating with the base station in a second BWP different from the first BWP; wherein the inactivity timer is paused for a time duration over which an uplink listen-before-talk (LBT) transmission fails.

Example 59

The method of example 58, wherein a maximum value of the inactivity timer is larger than a corresponding inactivity timer maximum value used when wirelessly communicating in at least one other BWP different from the first BWP.

Example 60

The method of example 59, wherein the maximum value of the inactivity timer is larger than a corresponding inactivity timer maximum value used when wirelessly communicating in licensed spectrum.

Example 61

The method of any one of examples 58 to 60, wherein the inactivity timer is restarted in response to sending, after an LBT listening period, an uplink transmission in the first BWP that was scheduled by the base station.

Example 62

A user equipment (UE) configured to perform the method of any one of examples 58 to 61.

Example 63

A user equipment (UE) comprising: a memory having processor-executable instructions stored thereon; a processor configured to execute the processor-executable instructions in order to cause the UE to perform the method of any one of examples 58 to 61.

Example 64

A UE comprising: an inactivity timer; a transmitter; and a receiver; the UE configured to wirelessly communicate with a base station in a first bandwidth part (BWP) of unlicensed spectrum, and upon expiry of the inactivity timer, instead wirelessly communicate with the base station in a second BWP different from the first BWP; wherein the UE is configured to pause the inactivity timer for a time duration over which an uplink listen-before-talk (LBT) transmission fails.

Example 65

The method of any one of examples 1 to 9, comprising determining that the wireless channel is unoccupied in the frequency region of at least two of the uplink frequency partitions, and transmitting the uplink transmission comprising additional uplink control information and/or uplink data on the at least two uplink frequency partitions.

Example 66

The method of example 65, wherein the additional uplink control information comprises HARQ feedback (e.g. HARQ-ACK feedback) corresponding to one or more downlink transmit blocks transmitted in one or more channel occupancy times (COTs) earlier than a COT in which the UE received the downlink transmission.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by a user equipment (UE), the method comprising:
receiving a downlink transmission indicating a plurality of time-frequency resources allocated for uplink transmission of the UE, the plurality of time-frequency resources being in a plurality of uplink frequency partitions of an unlicensed spectrum that do not overlap with each other in a frequency domain;
for each uplink frequency partition of the plurality of uplink frequency partitions: listening to a wireless channel in a frequency region of the uplink frequency partition to determine whether the wireless channel is unoccupied in the frequency region of the uplink frequency partition; and
transmitting an uplink transmission in at least one of the plurality of uplink frequency partitions for which the frequency region of the wireless channel is unoccupied.

2. The method of claim 1, wherein the uplink transmission comprises hybrid automatic repeat request (HARQ) feedback corresponding to a downlink transport block (TB).

3. The method of claim 1, wherein the downlink transmission includes downlink control information (DCI) that indicates the plurality of time-frequency resources.

4. The method of claim 1, wherein the uplink transmission is scheduled on a control channel.

5. The method of claim 1, wherein the plurality of uplink frequency partitions overlap with each other in time.

6. The method of claim 1, wherein the plurality of uplink frequency partitions are in a same bandwidth part (BWP).

7. The method of claim 1, comprising determining that the wireless channel is unoccupied in the frequency region of at least two of the plurality of uplink frequency partitions, and selecting one of the at least two of the plurality of uplink frequency partitions on which to transmit the uplink transmission.

8. The method of claim 1, comprising determining that the wireless channel is unoccupied in the frequency region of at least two of the plurality of uplink frequency partitions, and transmitting the uplink transmission comprising either additional uplink control information or uplink data or both on the at least two of the plurality of uplink frequency partitions.

9. The method of claim 8, wherein the additional uplink control information comprises HARQ feedback corresponding to one or more downlink transmit blocks transmitted in one or more channel occupancy times (COTs) earlier than a COT in which the UE received the downlink transmission.

10. The method of claim 1, wherein the downlink transmission includes a set of bits that indicate the plurality of time-frequency resources, wherein the set of bits comprises a plurality of bit subsets, and each bit subset of the plurality of bit subsets corresponds to a respective one of the plurality of uplink frequency partitions.

11. A user equipment (UE) comprising:
a processor; and
a non-transitory computer readable storage medium storing programming for execution by the processor, the programming comprising instructions to:
receive a downlink transmission indicating a plurality of time-frequency resources allocated for uplink transmission of the UE, the plurality of time-frequency resources being in a plurality of uplink frequency partitions of an unlicensed spectrum that do not overlap with each other in a frequency domain;
for each uplink frequency partition of the plurality of uplink frequency partitions: listen to a wireless channel in a frequency region of the uplink frequency partition to determine whether the wireless channel is unoccupied in the frequency region of the uplink frequency partition; and
transmit an uplink transmission in at least one of the plurality of uplink frequency partitions for which the frequency region of the wireless channel is unoccupied.

12. The UE of claim 11, wherein the uplink transmission comprises hybrid automatic repeat request (HARQ) feedback corresponding to a downlink transport block (TB).

13. The UE of claim 11, wherein the downlink transmission includes downlink control information (DCI) that indicates the plurality of time-frequency resources.

14. The UE of claim 11, wherein the uplink transmission is scheduled on a control channel.

15. The UE of claim 11, wherein the plurality of uplink frequency partitions overlap with each other in time.

16. The UE of claim 11, wherein the programming further comprises instructions to: upon determining that the wireless channel is unoccupied in the frequency region of at least two of the plurality of uplink frequency partitions, select one of the at least two of the plurality of uplink frequency partitions on which to transmit the uplink transmission.

17. The UE of claim 11, wherein the programming further comprises instructions to: upon determining that the wireless channel is unoccupied in the frequency region of at least two of the plurality of uplink frequency partitions, transmit the uplink transmission comprising either additional uplink control information or uplink data or both on the at least two of the plurality of uplink frequency partitions.

18. The UE of claim 17, wherein the additional uplink control information comprises HARQ feedback corresponding to one or more downlink transmit blocks transmitted in one or more channel occupancy times (COTs) earlier than a COT in which the UE received the downlink transmission.

19. A method performed by a base station, the method comprising:
transmitting to a user equipment (UE) a downlink transmission indicating a plurality of time-frequency resources allocated for uplink transmission of the UE, the plurality of time-frequency resources located in a plurality of uplink frequency partitions of an unlicensed spectrum that the UE listens to before uplink transmission, the plurality of uplink frequency partitions not overlapping with each other in a frequency domain; and
performing blind decoding on the plurality of time-frequency resources to obtain an uplink transmission in at least one of the plurality of uplink frequency partitions.

20. The method of claim 19, wherein the uplink transmission comprises hybrid automatic repeat request (HARQ) feedback corresponding to a downlink transport block (TB).

21. The method of claim 19, wherein the downlink transmission includes downlink control information (DCI) that indicates the plurality of time-frequency resources.

22. The method of claim 19, wherein the uplink transmission is scheduled on a control channel.

23. The method of claim 19, wherein the plurality of uplink frequency partitions overlap with each other in time.

24. The method of claim 19, wherein the plurality of uplink frequency partitions are in a same bandwidth part (BWP).

25. A base station comprising:
a transmitter to transmit to a user equipment (UE) a downlink transmission indicating a plurality of time-frequency resources allocated for uplink transmission of the UE, the plurality of time-frequency resources located in a plurality of uplink frequency partitions of an unlicensed spectrum that the UE listens to before uplink transmission, the plurality of uplink frequency partitions not overlapping with each other in a frequency domain; and
a decoder to perform blind decoding on the plurality of time-frequency resources to obtain an uplink transmission in at least one of the plurality of uplink frequency partitions.

26. The base station of claim 25, wherein the uplink transmission comprises hybrid automatic repeat request (HARQ) feedback corresponding to a downlink transport block (TB).

27. The base station of claim 25, wherein the downlink transmission includes downlink control information (DCI) that indicates the plurality of time-frequency resources.

28. The base station of claim 25, wherein the uplink transmission is scheduled on a control channel.

29. The base station of claim 25, wherein the plurality of uplink frequency partitions overlap with each other in time.

30. The base station of claim 25, wherein the plurality of uplink frequency partitions are in a same bandwidth part (BWP).

* * * * *